(12) United States Patent
Hung et al.

(10) Patent No.: US 12,547,259 B2
(45) Date of Patent: *Feb. 10, 2026

(54) PEN DATA STORAGE APPARATUS

(71) Applicant: Wacom Co., Ltd., Saitama (JP)

(72) Inventors: Ipei Hung, Saitama (JP); Akiyuki Kake, Saitama (JP); Kizuku Ishimaru, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,374

(22) Filed: Aug. 20, 2024

(65) Prior Publication Data

US 2024/0411392 A1   Dec. 12, 2024

Related U.S. Application Data

(63) Continuation of application No. 18/346,083, filed on Jun. 30, 2023, now Pat. No. 12,093,474, which is a continuation of application No. PCT/JP2021/046903, filed on Dec. 20, 2021.

(30) Foreign Application Priority Data

Jan. 5, 2021 (JP) ................................ 2021-000500

(51) Int. Cl.
*G06F 3/038* (2013.01)
*G06F 3/0354* (2013.01)

(52) U.S. Cl.
CPC ........ *G06F 3/0383* (2013.01); *G06F 3/03545* (2013.01); *G06F 2203/0384* (2013.01)

(58) Field of Classification Search
CPC ............... G06F 3/0383; G06F 3/03545; G06F 2203/0384; G06F 3/038; G06F 3/04162; G06V 30/32

See application file for complete search history.

(56) References Cited

U.S. PATENT DOCUMENTS

| | | | |
|---|---|---|---|
| 7,158,675 B2 | 1/2007 | Gounares et al. | |
| 11,237,647 B2 | 2/2022 | Kake et al. | |
| 12,093,474 B2 * | 9/2024 | Hung | ................ G06F 3/03545 |
| 2003/0215140 A1 | 11/2003 | Gounares et al. | |
| 2014/0075302 A1 | 3/2014 | Akashi | |
| 2019/0187823 A1 | 6/2019 | Kake et al. | |

FOREIGN PATENT DOCUMENTS

| | | |
|---|---|---|
| JP | 2003330605 A | 11/2003 |
| JP | 4292927 B2 | 7/2009 |
| JP | 2014052873 A | 3/2014 |
| JP | 2015109052 A | 6/2015 |
| JP | 2019136513 A | 8/2019 |

OTHER PUBLICATIONS

International Search Report, mailed Feb. 1, 2022, for International Patent Application No. PCT/JP2021/046903. (2 pages).

* cited by examiner

*Primary Examiner* — Matthew A Eason
*Assistant Examiner* — Chayce R Bibbee
(74) *Attorney, Agent, or Firm* — Seed Intellectual Property Law Group LLP

(57) ABSTRACT

Provided is a pen data storage apparatus that stores pen data including at least coordinate data regarding a position instructed and input by an electronic pen, in units of the pen data, in which each piece of the stored pen data includes function identification information that identifies a processing function for the pen data.

20 Claims, 13 Drawing Sheets

PEN DATA STORAGE APPARATUS

This application relies upon the earlier filing date of prior U.S. Patent Application No. 18/346,083, filed Jun. 30, 2023, now U.S. Pat. No. 12,093,474, under 35 U.S.C. § 120.

BACKGROUND

Technical Field

The disclosure relates to a pen data storage apparatus that stores pen data including coordinate data regarding a position instructed and input by an electronic pen.

Description of the Related Art

In recent years, a combination of an electronic pen and a position detection device is often used as an input unit of electronic equipment. The position detection device has a function of detecting coordinates of a position instructed and input by the electronic pen. In many cases, the position detection device can also detect a pen pressure value applied to the pen tip of the electronic pen, a tilt angle of the electronic pen, a height of the pen tip (height from input surface), and the like in addition to the coordinates of the position instructed by the electronic pen.

An information processing device integrated with or separate from the position detection device processes the pen data including the coordinates of the position detected by the position detection device, the pen pressure value, the tilt angle, the height, the time of instruction input, and the like and generates, for example, writing trace data or drawing data regarding a picture as processing result data in chronological order. The information processing device executes a process of using the generated writing trace data to display a character image on the display screen or using the generated drawing data to display a drawing image on the display screen. In this case, the pen pressure value, the tilt angle, and the like are reflected on the thickness of lines, the shades of colors, and the like of the character image or the drawing image.

The electronic data, such as writing trace data and drawing data, processed and generated by the information processing device is typically stored in units of files in a memory of the information processing device. In this case, the information processing device adds extensions indicating processing applications to file names and stores and manages the files of the writing trace data and the drawing data (see Japanese Patent Laid-open No. 2015-109052).

A system proposed in Japanese Patent Laid-open No. 2019-136513 collects a large amount of biological information, such as blood pressure, pulse, and body temperature of the user of the electronic pen, associated with the pen data, instead of storing the data in units of files, and estimates the emotion of the user at the time of performing instruction input by the electronic pen.

That is, the emotion estimation system of Japanese Patent Laid-open No. 2015-109052 stores a large amount of data (big data) including the pen data and the biological information associated with each other and associates the emotion derived from the biological information with features or the like of the pen data that are demonstrated at the time of expression of the emotion, to thereby create an emotion database. When the emotion estimation apparatus receives pen data including an acquisition request for emotion, the emotion estimation apparatus refers to the emotion database to detect the emotion corresponding to the features of the pen data included in the acquisition request and transmits the answer to the requester for the emotion.

In recent years, electronic data, such as pen data, can be stored in a server apparatus with a large storage capacity, and data generated in the past can be extracted and used at an appropriate timing. In this case, a cloud service stored in a server apparatus on the Internet is also increasingly used.

As described above, the extensions of the processing applications in the information processing device are typically added to the file names, and the pen data is stored and managed in units of files. When the pen data is stored in units of files in storing the electronic data in the server apparatus, the files should be opened to extract the pen data in order to reproduce the processes in which individual pieces of pen data in the files are used, and this is troublesome.

In this regard, when the pen data is stored as in Japanese Patent Laid-open No. 2019-136513, the process of opening the files is not necessary, and the pen data can swiftly be accessed. However, the pen data in this case is not stored in association with the extensions or the like of the processing applications unlike in the case of being stored in units of files, and what kind of processing application should be used to process the pen data is not clear. Hence, it is difficult to use appropriate processing applications to process the pen data, and there is a problem of difficulty in reproducing and checking the usage of the input pen data.

In addition, what kind of processing application should be used to process each piece of the pen data is not clear, and which pieces of pen data should be processed by the same processing application is not clear. In that regard, there is a problem that appropriate reproduction of the pen data is difficult.

BRIEF SUMMARY

An object of the present disclosure is to provide a pen data storage apparatus that can solve the problems.

To solve the problems, provided is a pen data storage apparatus a processor and a memory storing one or more programs that, when executed by the processor, cause the pen data storage apparatus to store pen data including at least coordinate data regarding a position instructed and input by an electronic pen, wherein the pen data includes function identification information that identifies a processing function for the pen data.

According to the pen data storage apparatus with the abovementioned configuration, the pen data is stored in units of the pen data, and a process of opening files to extract and use the pen data as in the case of storing the pen data in units of files is not necessary. The pen data includes the function identification information that identifies the processing function for the pen data. Thus, the processing function specified by the function identification information can be used to process each piece of the pen data when the pen data is acquired, and a processing result of the pen data can be reproduced.

DETAILED DESCRIPTION

Figure 1:
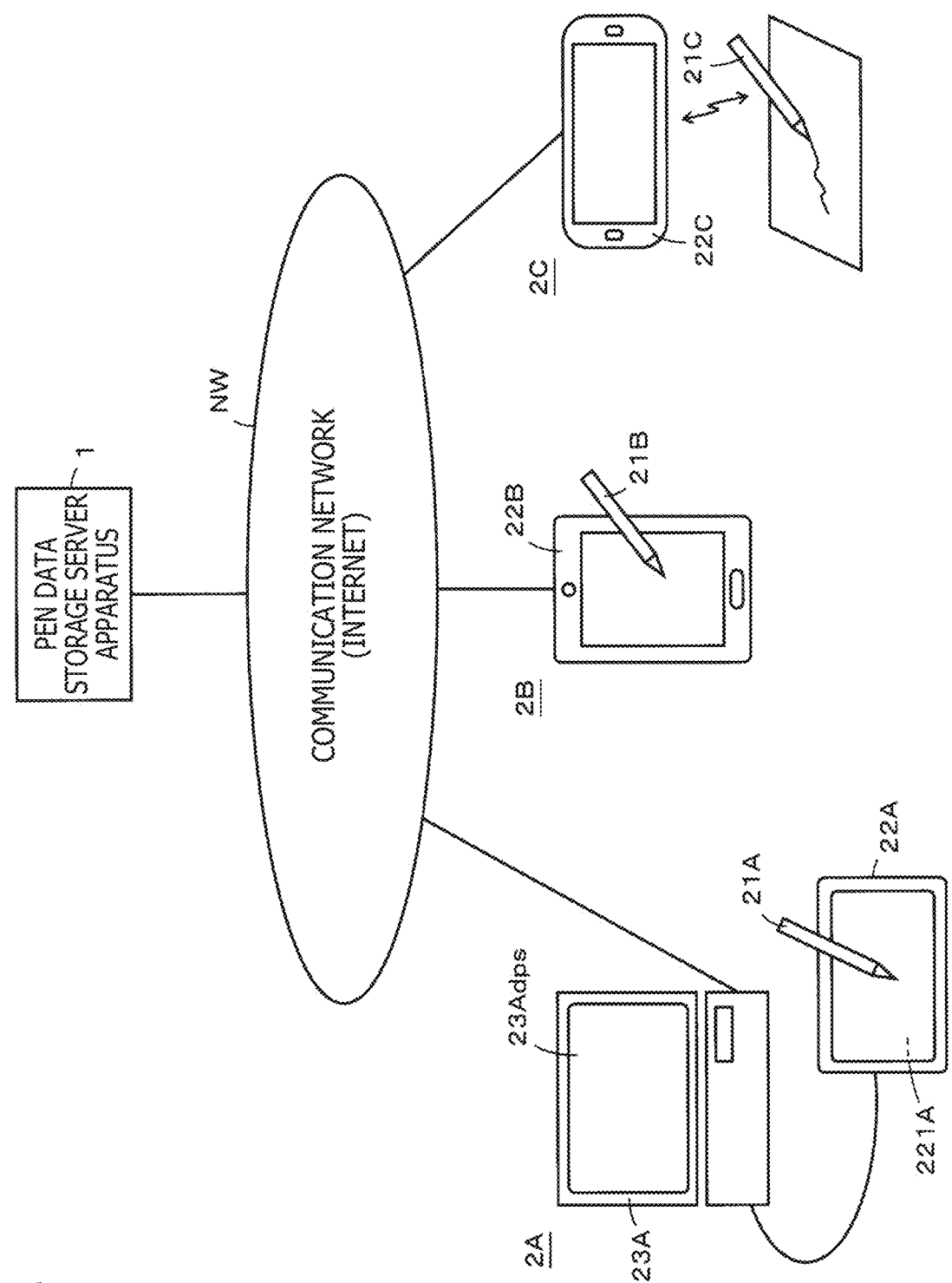
FIG. 1 depicts a system configuration example of a pen data storage apparatus according to an embodiment of the disclosure.

A pen data storage apparatus according to an embodiment of the disclosure will now be described with reference to the drawings. FIG. 1 is a diagram describing an overview of the pen data storage apparatus according to the embodiment of the disclosure. The pen data storage apparatus of the embodiment has a configuration of a network system, and in the example, a plurality of pen input apparatuses 2A, 2B, 2C, . . . are connected to a pen data storage server apparatus 1 through a communication network NW including the Internet.

The pen input apparatuses 2A, 2B, 2C, . . . can be various types of apparatuses. The pen input apparatuses 2A, 2B, 2C, . . . illustrated in the example of FIG. 1 are pen input apparatuses with different types of configurations.

Configuration Example of Pen Input Apparatus 2A

The pen input apparatus 2A includes an electronic pen 21A, a tablet 22A as an example of a position detection device unit, and a personal computer (hereinafter, abbreviated as PC) 23A as an example of an information processing device unit. In the pen input apparatus 2A, a display region of a display screen of a display 23Adsp included in the PC 23A and a position detection region of a position detection sensor 221A included in the tablet 22A are associated with each other. The user can use the electronic pen 21A to input an instruction on an input surface of the position detection sensor 221A of the tablet 22A while viewing the display screen of the display 23Adsp.

The tablet 22A detects the instruction input by the electronic pen 21A, the pen pressure value, and the like to generate pen data and supplies the pen data to the PC 23A. In the example, the tablet 22A includes information regarding the time (year, month, day, hour, minute, and second) of generation of the pen data in the pen data and generates the pen data.

The PC 23A applies information processing designated by the user to the received pen data and displays the processing result on the display screen of the display 23Adsp. The PC 23A generates storage pen data including function identification information (hereinafter, referred to as function identification (ID)) for identifying the information processing function applied to the received pen data and transmits the generated storage pen data to the pen data storage server apparatus 1 through the communication network NW. In the example, the PC 23A includes position information regarding the location of the information processing in the storage pen data. Note that the tablet 22A may be configured to include the position information regarding the location of the information processing in the storage pen data.

Figure 2:
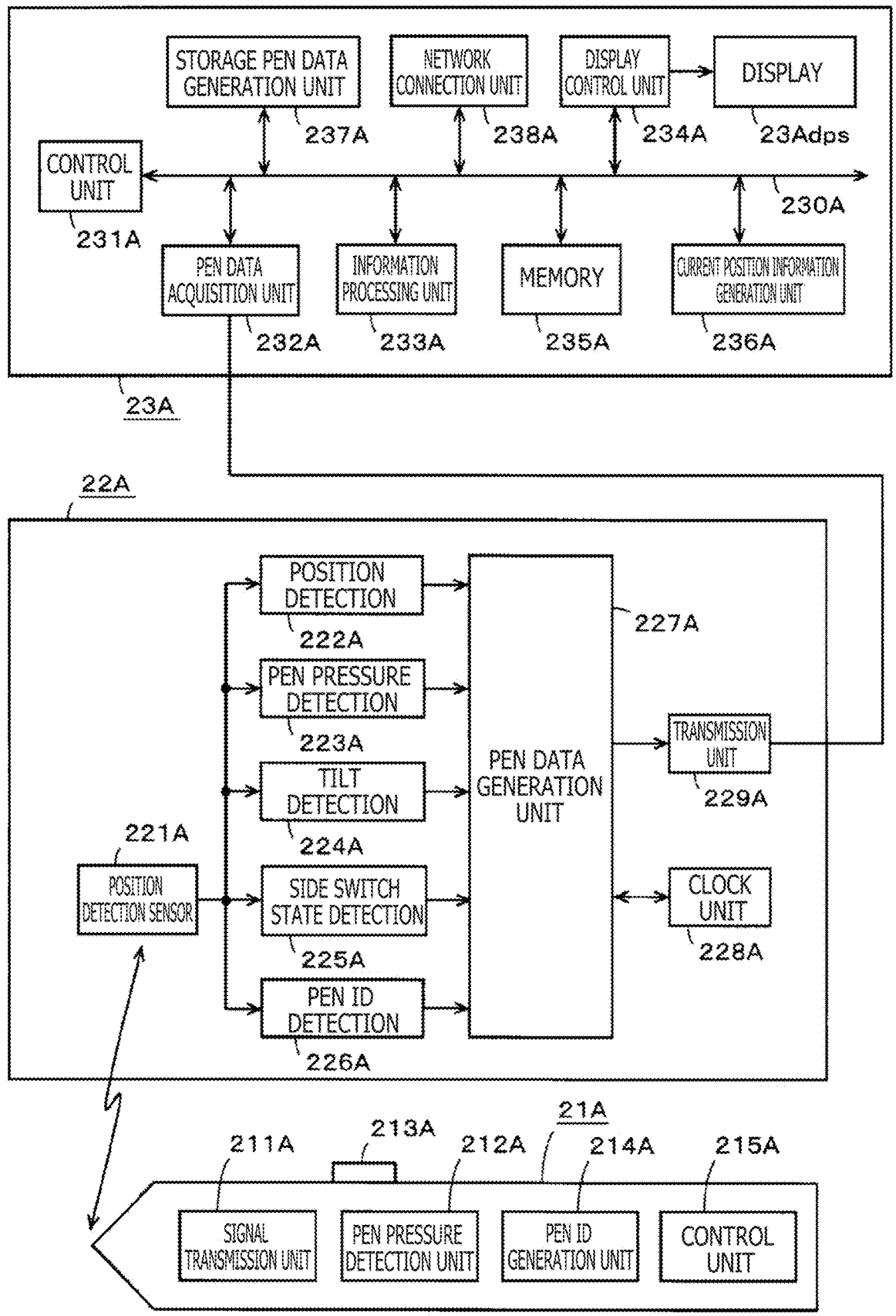
FIG. 2 is a block diagram illustrating a configuration example of a pen input apparatus in the system of the example of FIG. 1.

FIG. 2 is a block diagram for describing a configuration of the pen input apparatus 2A of the example, and configuration examples of the electronic pen 21A, the tablet 22A, and the PC 23A will be described with reference to FIG. 2.

Configuration Example of Electronic Pen 21A

The electronic pen 21A of the example includes a signal transmission unit 211A, a pen pressure detection unit 212A, a side switch 213A, a pen identification information (hereinafter, referred to as pen ID) generation unit 214A, and a control unit 215A.

In the example, the electronic pen 21A is an electronic pen of electromagnetic resonance type, and the signal transmission unit 211A includes a resonant circuit.

The pen pressure detection unit 212A is configured to detect the pen pressure applied to a pen tip portion of the electronic pen 21A when the pen tip portion is pressed against the input surface of the tablet 22A, and the pen pressure detection unit 212A is a well-known component that detects the pressure as, for example, a change in capacitance. A variable capacitor including the pen pressure detection unit 212A is provided as part of the resonant circuit of the signal transmission unit 211A, and the pen pressure value is transmitted as a change in resonant frequency of the resonant circuit to the tablet 22A. Note that the pen pressure detection unit 212A may be configured to detect a change in inductance or a change in resistance.

The side switch 213A is a switch turned on and off by an operation performed by the user. In the example, the switch is turned on and off to control the connection and non-connection of the capacitor to the resonant circuit of the signal transmission unit 211A, change the resonant frequency of the resonant circuit, and thereby transmit the operation state of the side switch 213A to the tablet 22A. The operation of the side switch 213A is, for example, an operation instruction similar to a click operation of a mouse on the PC 23A.

The pen ID generation unit 214A is configured to generate a pen ID that is unique identification information for identifying each electronic pen 21A, and the pen ID generation unit 214A includes a memory that stores the pen ID. In the example, the control unit 215A is configured to convert the pen ID into a digital signal of a plurality of bits and use the digital signal to intermittently shift the action of the resonant circuit of the signal transmission unit 211A and thereby transmit the digital signal of the pen ID as an amplitude shift keying (ASK) modulation signal or an on-off keying (OOK) modulation signal to the tablet 22A.

Note that, as with the pen ID, each of the pen pressure value detected by the pen pressure detection unit 212A and the information regarding the operation state of the side switch 213A may be converted into a digital signal, and an ASK modulation signal or an OOK modulation signal may be transmitted to the tablet 22A, instead of being transmitted as a change in the resonant frequency of the resonant circuit to the tablet 22A.

Configuration Example of Tablet 22A

The tablet 22A includes the position detection sensor 221A of electromagnetic resonance type in the example. Although not illustrated, the position detection sensor 221A includes a plurality of loop coils arrayed in the horizontal direction and the vertical direction (corresponding to an X-axis direction and a Y-axis direction of coordinates) of a rectangular flexible board. Accordingly, the position detection sensor 221A includes a rectangular position detection region.

The position detection sensor 221A is magnetically inductively coupled to the resonant circuit of the electronic pen 21A to transmit and receive signals to and from the electronic pen 21A. The signal detected (received) by the position detection sensor 221A is supplied to each of a position detection circuit 222A, a pen pressure detection circuit 223A, a tilt detection circuit 224A, a side switch state detection circuit 225A, and a pen ID detection circuit 226A.

The position detection circuit 222A detects the position of the loop coil that has received the signal, to detect the coordinates of the position instructed and input by the electronic pen 21A, and supplies the detected coordinates of the position (including information regarding the height from the input surface of the position detection sensor 221A) to a pen data generation unit 227A.

The pen pressure detection circuit 223A in the example detects a change in the frequency of the reception signal to detect the pen pressure applied to the pen tip of the electronic pen 21A and supplies the detected pen pressure value to the pen data generation unit 227A.

The tilt detection circuit 224A in the example detects an angle between the axial direction of the electronic pen 21A and the input surface of the position detection sensor 221A according to the pattern shape of the area where the signal from the electronic pen 21A is received in the detection region of the position detection sensor 221A. The tilt detection circuit 224A detects the angle as a tilt angle of the electronic pen 21A. The tilt detection circuit 224A supplies the information regarding the detected tilt angle to the pen data generation unit 227A.

The side switch state detection circuit 225A in the example detects a change in the frequency of the reception signal to detect the operation state of the side switch 213A of the electronic pen 21A and supplies the information regarding the detected operation state of the side switch 213A to the pen data generation unit 227A.

The pen ID detection circuit 226A detects the ASK modulation signal or the OOK modulation signal of the pen ID from the signal received from the electronic pen 21A through the position detection sensor 221A and demodulates the pen ID. The pen ID detection circuit 226A supplies the demodulated pen ID to the pen data generation unit 227A.

The pen data generation unit 227A generates pen data including sequentially arranged data. The data includes the coordinates of the position instructed and input by the electronic pen 21A received from the position detection circuit 222A, the pen pressure value from the pen pressure detection circuit 223A, the information regarding the tilt angle from the tilt detection circuit 224A, the information regarding the operation state of the side switch 213A from the side switch state detection circuit 225A, and the pen ID from the pen ID detection circuit 226A. The pen data generation unit 227A further includes-information from a clock unit 228A in the data to generate the pen data. The pen data generation unit 227A transmits the generated pen data to the PC 23A through a transmission unit 229A.

Configuration Example of PC 23A

In an example of the main configuration of the PC 23A in the pen data storage apparatus of the embodiment, each of a pen data acquisition unit 232A, an information processing unit 233A, a display control unit 234A, a memory 235A, a current position information generation unit 236A, a storage pen data generation unit 237A, and a network connection unit 238A is connected to a control unit 231A including a central processing unit (CPU), a program memory, and a work area memory through a system bus 230A as illustrated in FIG. 2.

The pen data acquisition unit 232A acquires the pen data from the tablet 22A and transfers the pen data to the information processing unit 233A and the storage pen data generation unit 237A.

The information processing unit 233A executes a processing function of a desktop (function of an operating system (OS)) and executes processing functions of a plurality of pieces of application software (hereinafter, abbreviated as apps) in the example. In this case, the information processing unit 233A in the example executes the processing function according to the operation instructed by the user using the electronic pen 21A. The processing function of the app launched by the user among the plurality of apps is executed. The PC 23A can launch a plurality of apps and operate the apps in parallel in the example.

The display control unit 234A displays, on the display screen of the display 23Adsp, a display image based on the information regarding the processing result of the information processing unit 233A, such as an image of a writing trace by the electronic pen 21A. The information regarding the processing result of the information processing unit 233A is stored in the memory 235A in reference to a saving instruction of the user.

The current position information generation unit 236A generates position information regarding the location where the PC 23A is installed (information regarding current position). The current position information generation unit 236A may include, for example, a global positioning system (GPS) receiver and detect the current position to generate the information regarding the current position or may be, for example, a memory that stores the position information regarding the current position input by the user.

The storage pen data generation unit 237A includes the information regarding the current position from the current position information generation unit 236A and the function ID for the processing function of processing the pen data from the information processing unit 233A in the pen data from the pen data acquisition unit 232A to generate storage pen data. The storage pen data generation unit 237A transmits the generated storage pen data to the pen data storage server apparatus 1 connected to the communication network NW through the network connection unit 238A.

The network connection unit 238A is connected with a wire to an optical line or the like in the example and connected to the communication network NW. Note that the network connection unit 238A may be connected to the communication network NW (Internet) through a wireless network such as Wi-Fi (registered trademark).

Description of Main Processing Action of PC 23A

The information processing unit 233A in the example determines the processing function of processing the pen data in reference to the position coordinates included in the pen data, the pen pressure value, the state information regarding the side switch 213A, and the like. When there is an operation input unit other than the tablet 22A, the processing function of processing the pen data may be launched and determined in advance in reference to the operation information from the operation input unit. The PC 23A uses the determined processing function to process the pen data and includes, in the pen data, the function ID of the processing function that has processed the pen data, to generate storage pen data. The PC 23A transmits the storage pen data to the pen data storage server apparatus 1 (hereinafter, referred to as the server apparatus 1).

FIGS. 3A to 3D depict display examples of a display screen 23AP of the display 23Adsp of the PC 23A. The determination procedure of the processing function for processing the pen data, the generation of the storage pen data, and the transmission of the storage pen data to the server apparatus 1 will be described below with reference to FIGS. 3A to 3D.

Note that the position instructed by the pen tip portion of the electronic pen 21A is indicated as a pen tip position of a schematic figure of the electronic pen 21A (hereinafter, referred to as the pen instruction position) in FIGS. 3A to 3D. The user uses the electronic pen 21A to perform an instruction input operation on the input surface of the position detection sensor 221A of the tablet 22A. As described above, the detection region of the input surface of the position detection sensor 221A of the tablet 22A corresponds to the display region of the display screen 23AP. Hence, in the display screen 23AP of the display 23Adsp of the PC 23A, the pen tip position of the electronic pen 21A is displayed at the display position corresponding to the instruction position on the input surface of the position detection sensor 221A instructed by the pen tip portion of the electronic pen 21A.

Figure 3A:
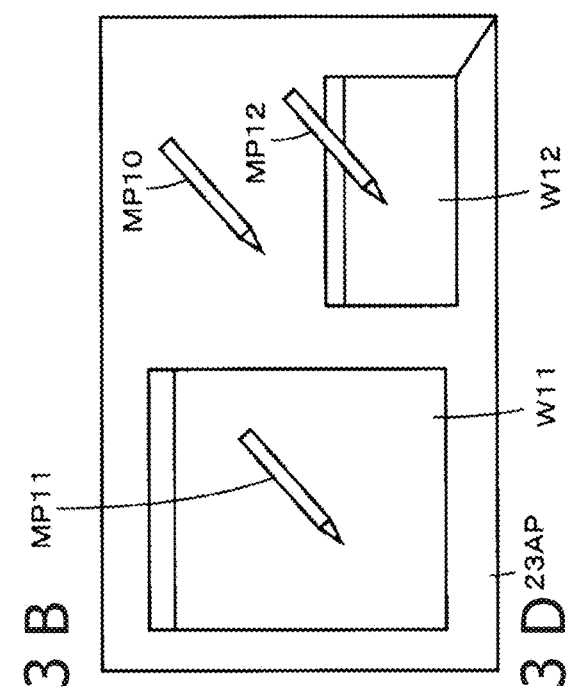
FIGS. 3A to 3D are diagrams for describing display examples of a display screen in configuration examples of the pen input apparatus and another pen input apparatus in the system of the example of FIG. 1.

FIG. 3A illustrates an example of the desktop screen in the PC 23A, and shortcut icons SI of a plurality of apps and a processing window W1 of one app launched by the user are displayed in the example of FIG. 3A.

When the user uses the electronic pen 21A to input an instruction in a region other than the region of the processing window W1 of the app in the desktop screen as indicated by pen instruction positions MP1 and MP2 in the example of FIG. 3A, the information processing unit 233A of the PC 23A determines that the instruction is input on the desktop and uses the processing function of the desktop to process the pen data regarding the instruction input.

In this case, although the information processing unit 233A displays the location of the instruction position (displays a cursor) for a simple operation input of the position instruction using the electronic pen 21A at the pen instruction position MP1 or MP2, the information processing unit 233A does not use the processing function of the desktop to execute a specific process. The information processing unit 233A in the example determines whether or not the side switch 213A of the electronic pen 21A is used to perform a significant operation corresponding to a click operation, in addition to the position instruction operation at the pen instruction position MP1 or MP2. When the information processing unit 233A determines that the significant operation is performed, the information processing unit 233A executes a process corresponding to the instruction position.

That is, when the information processing unit 233A of the PC 23A determines that the instruction is input in a region other than the display regions of the shortcut icons SI with reference to the pen data as indicated by the pen instruction position MP1 and determines that the instruction is accompanied by a significant operation, the information processing unit 233A displays a plurality of function items and setting items in a pull-down menu on the display screen 23AP and executes a process of waiting for a selection input to be made from the menu.

When the information processing unit 233A of the PC 23A determines that the instruction is input in a display region of the shortcut icons SI with reference to the pen data as indicated by the pen instruction position MP2 and determines that the instruction is accompanied by a significant operation, the information processing unit 233A launches the app corresponding to the shortcut icon SI instructed by the instruction input and executes a process of opening a processing window of the app on the display screen 23AP.

The information processing unit 233A has a window management function. When the information processing unit 233A launches the app and opens the processing window, the information processing unit 233A manages the display region of the processing window of the app and the corresponding detection region of the position detection sensor 221A. The information processing unit 233A uses the window management function to identify whether the position instructed and input by the electronic pen 21A is in the region of the opened processing window or in the region of the desktop screen.

When the user uses the electronic pen 21A to input an instruction in the region of the processing window W1 of the app on the desktop screen in the example of FIG. 3A as indicated by a pen instruction position MP3, the information processing unit 233A uses the app corresponding to the processing window W1 to process the pen data.

The storage pen data generation unit 237A of the PC 23A includes the position information regarding the current position from the current position information generation unit 236A as information regarding the location, in the pen data at the pen instruction position MP1 or MP2. The storage pen data generation unit 237A in the example includes the function ID of the processing function of the desktop in the pen data to generate storage pen data regardless of whether or not the processing function of the desktop is used to execute a specific process as described above and transmits the storage pen data to the server apparatus 1.

The storage pen data generation unit 237A of the PC 23A includes the position information regarding the current position from the current position information generation unit 236A as position information regarding the location, in the pen data at the pen instruction position MP3, and includes the function ID of the app corresponding to the processing window W1 in the pen data to generate storage pen data. The storage pen data generation unit 237A transmits the storage pen data to the server apparatus 1.

In this way, the storage pen data is stored in the server apparatus 1 even when the pen data is not processed by the processing function of the desktop. As a result, the storage pen data also includes the information regarding time, and when the storage pen data is read and reprocessed in chronological order, the track of processing by the PC 23A based on the input operation performed by the user using the electronic pen 21A on the input surface of the tablet 22A is entirely reproduced, including the fact that there was a time zone in which the user was thinking and not performing an effective instruction operation, for example.

Note that, when the pen data is not processed by the processing function of the desktop, the storage pen data may not be generated for the pen data. The pen data may not be transmitted to the server apparatus 1, and the pen data may be excluded from the data to be stored.

Figure 3B:
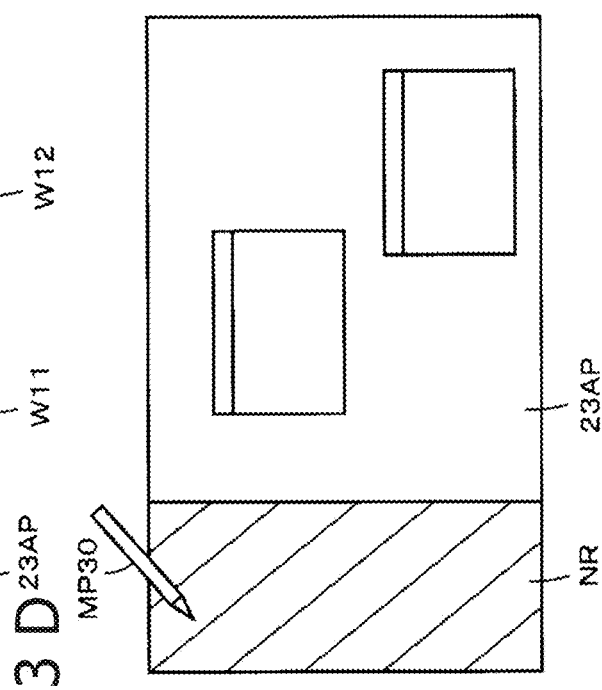
Figure 3C:
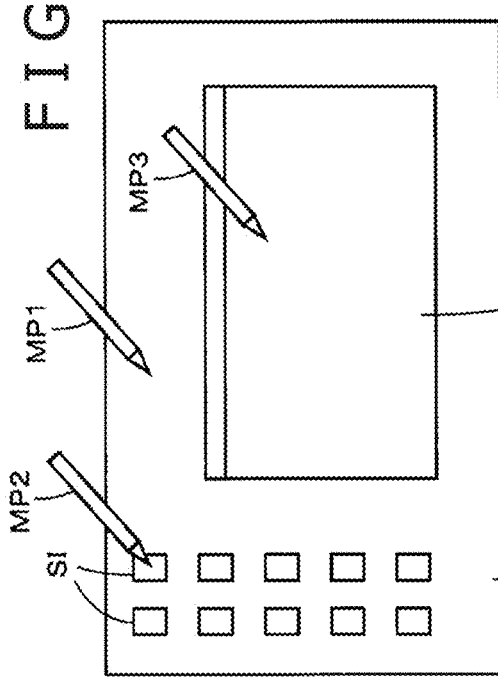

FIG. 3B illustrates a state in which the information processing unit 233A executes a process to launch a plurality of apps, two apps in the example of FIG. 3B, and respective processing windows W11 and W12 are opened and displayed without the window regions overlapping with each other. FIG. 3C illustrates a state in which two apps are similarly launched, and respective processing windows W21 and W22 are opened. However, the two processing windows W21 and W22 are displayed with the window regions partially overlapping with each other.

As described above, the information processing unit 233A has the window management function. The information processing unit 233A uses the window management function to manage the display region of the processing window of the launched app and the corresponding detection region of the position detection sensor 221A not only when there is one window, but also when there are a plurality of windows.

The window management function of the information processing unit 233A performs hierarchical management of the processing windows even when there are overlapping regions of a plurality of processing windows, and this allows one of the processing windows to be determined as one in which the instruction is input by the electronic pen 21A. That is, when a plurality of processing windows are opened with the regions overlapping with each other, the information processing unit 233A determines that the processing window in which the instruction is lastly input by the electronic pen 21A is highest ranked. The information processing unit 233A manages and processes that processing window in priority.

Hence, the information processing unit 233A uses the processing function of the desktop to process the pen data at a pen instruction position MP10 and a pen instruction position MP20 in FIGS. 3B and 3C, as with the pen data at the pen instruction position MP1 in FIG. 3A. The storage pen data generation unit 237A includes the position information regarding the current position from the current position information generation unit 236A as location information in the pen data and includes the function ID of the processing function of the desktop in the pen data to generate storage pen data. The storage pen data generation unit 237A transmits the storage pen data to the server apparatus 1.

In FIG. 3B, the app corresponding to the processing window W11 or the processing window W12 of the app in the information processing unit 233A processes the pen data at the pen instruction position MP11 or the pen instruction position MP12. The storage pen data generation unit 237A includes the function ID of the app corresponding to the processing window W11 in the pen data at the pen instruction position MP11. The storage pen data generation unit 237A includes the function ID of the app corresponding to the processing window W12 in the pen data at the pen instruction position MP12. The storage pen data generation unit 237A further includes the position information regarding the current position from the current position information generation unit 236A as location information in the pen data, to generate storage pen data, and transmits the storage pen data to the server apparatus 1.

The information processing unit 233A determines that an instruction input at a pen instruction position MP21 in FIG. 3C is an instruction input in the processing window W21, and the app corresponding to the processing window W21 processes the pen data. The storage pen data generation unit 237A includes the function ID of the app corresponding to the processing window W21 and the information regarding the location in the pen data to generate storage pen data and transmits the storage pen data to the server apparatus 1.

In FIG. 3C, the window management function of the information processing unit 233A determines that an instruction input at a pen instruction position MP22 in the overlapping region of the processing window W21 and the processing window W22 is an instruction input in the highest ranked processing window W22 in the example of FIG. 3C, and the app corresponding to the processing window W22 processes the pen data. The storage pen data generation unit 237A includes the function ID of the app corresponding to the processing window W22 and the information regarding the location in the pen data to generate storage pen data and transmits the storage pen data to the server apparatus 1.

Note that the information processing unit 233A determines that an instruction input at a pen instruction position MP23 in a region that is not the overlapping region of the processing window W22 is an instruction input in the processing window W22 in FIG. 3C. The app corresponding to the processing window W22 processes the pen data. The storage pen data generation unit 237A includes the function ID of the app corresponding to the processing window W22 and the information regarding the location in the pen data to generate storage pen data and transmits the storage pen data to the server apparatus 1.

Example of Flow of Processing Action for Pen Data in PC 23A

An example of a flow of the processing action for the pen data in the PC 23A described above will be described with reference to flow charts of FIGS. 4 and 5. The control unit 231A includes a processor that uses software programs stored in a memory to execute the functions of the components of the PC 23A illustrated in FIG. 2 and thereby carry out the action of each step in the following description of the flow charts.

The control unit 231A determines whether or not the pen data from the tablet 22A is received (step S101). The control unit 231A executes another process when the control unit 231A determines that the pen data is not received (step S102) and returns the process to step S101 after the process.

When the control unit 231A determines in step S101 that the pen data from the tablet 22A is received, the control unit 231A detects the coordinates of the position of the instruction input in the received pen data (step S103).

The control unit 231A determines whether or not the app is launched on the desktop (step S104). When the control unit 231A determines that the app is not launched, the control unit 231A recognizes that the instruction input at the detected coordinates of the position is an instruction input on the desktop and refers to the state information regarding the side switch 213A in the pen data to determine whether or not the instruction input is accompanied by a significant instruction operation such as a click instruction (step S105).

When the control unit 231A determines in step S105 that the instruction input is accompanied by a significant instruction operation, the control unit 231A uses the processing function of the desktop to process the pen data (step S106). When the control unit 231A determines in step S105 that the instruction input is not accompanied by a significant instruction operation, the control unit 231A determines that the pen data regarding the instruction input is an invalid instruction and does not execute the process with the processing function of the desktop (step S107).

After step S106 or step S107, the control unit 231A advances the process to step S108. The control unit 231A includes the position information regarding the current position from the current position information generation unit 236A as location information in the received pen data and includes the function ID of the processing function of the desktop in the pen data to generate storage pen data and transmits the storage pen data to the server apparatus 1 (step S108).

The control unit 231A determines whether or not an end instruction is received. When the control unit 231A determines that the end instruction is not received, the control unit 231A returns the process to step S101 and repeats the process from step S101. When the control unit 231A determines that the end instruction is received, the control unit 231A ends the processing routine.

Figure 5:
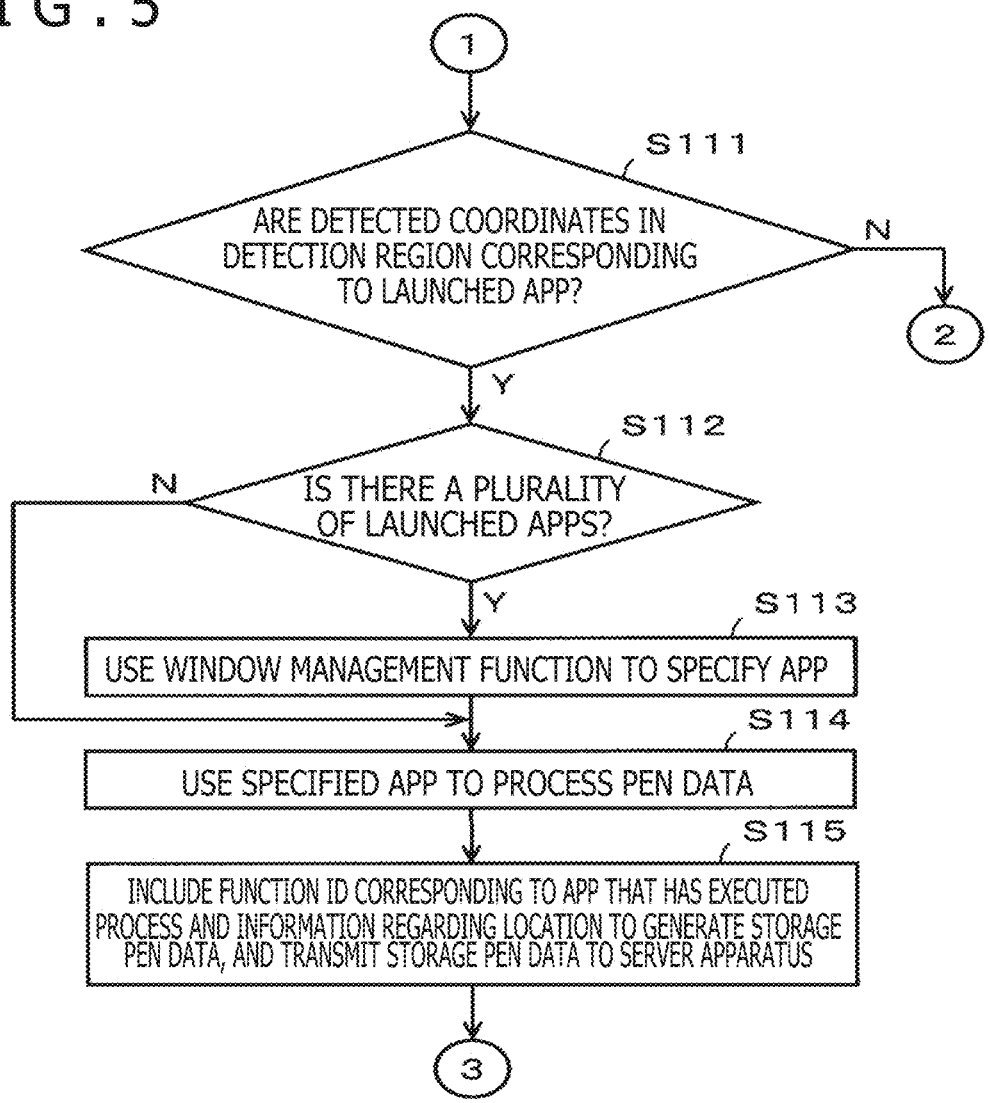
FIG. 5 depicts part of the flow chart for describing the processing action example in the configuration example of the pen input apparatus in the system of the example of FIG. 1.

When the control unit 231A determines in step S104 that the app is launched, the control unit 231A determines whether or not the coordinates of the pen instruction position are in the region of the processing window corresponding to the launched app (step S111 of FIG. 5).

When the control unit 231A determines in step S111 that the coordinates of the pen instruction position are not in the region of the processing window corresponding to the launched app, the control unit 231A recognizes that the pen instruction position is in the region of the desktop. The control unit 231A advances the process to step S105 of FIG. 4 and executes the process from step S105.

When the control unit 231A determines in step S111 that the coordinates of the pen instruction position are in the region of the processing window corresponding to the launched app, the control unit 231A determines whether or not a plurality of apps are launched (step S112). When the control unit 231A determines that a plurality of apps are launched, the control unit 231A uses the window management function to refer to the hierarchical information and specifies the processing window used to input the instruction, to thereby specify the corresponding app (step S113). The control unit 231A uses the app specified in step S113 to process the received pen data (step S114).

When the control unit 231A determines in step S112 that one app is launched instead of a plurality of apps, the control unit 231A advances to step S114 without going through step S113 and uses the one app to process the received pen data.

After step S114, the control unit 231A includes the function ID of the app that has executed the process in step S114 and the position information regarding the location in the received pen data to generate storage pen data and transmits the storage pen data to the server apparatus 1 (step S115).

Figure 4:
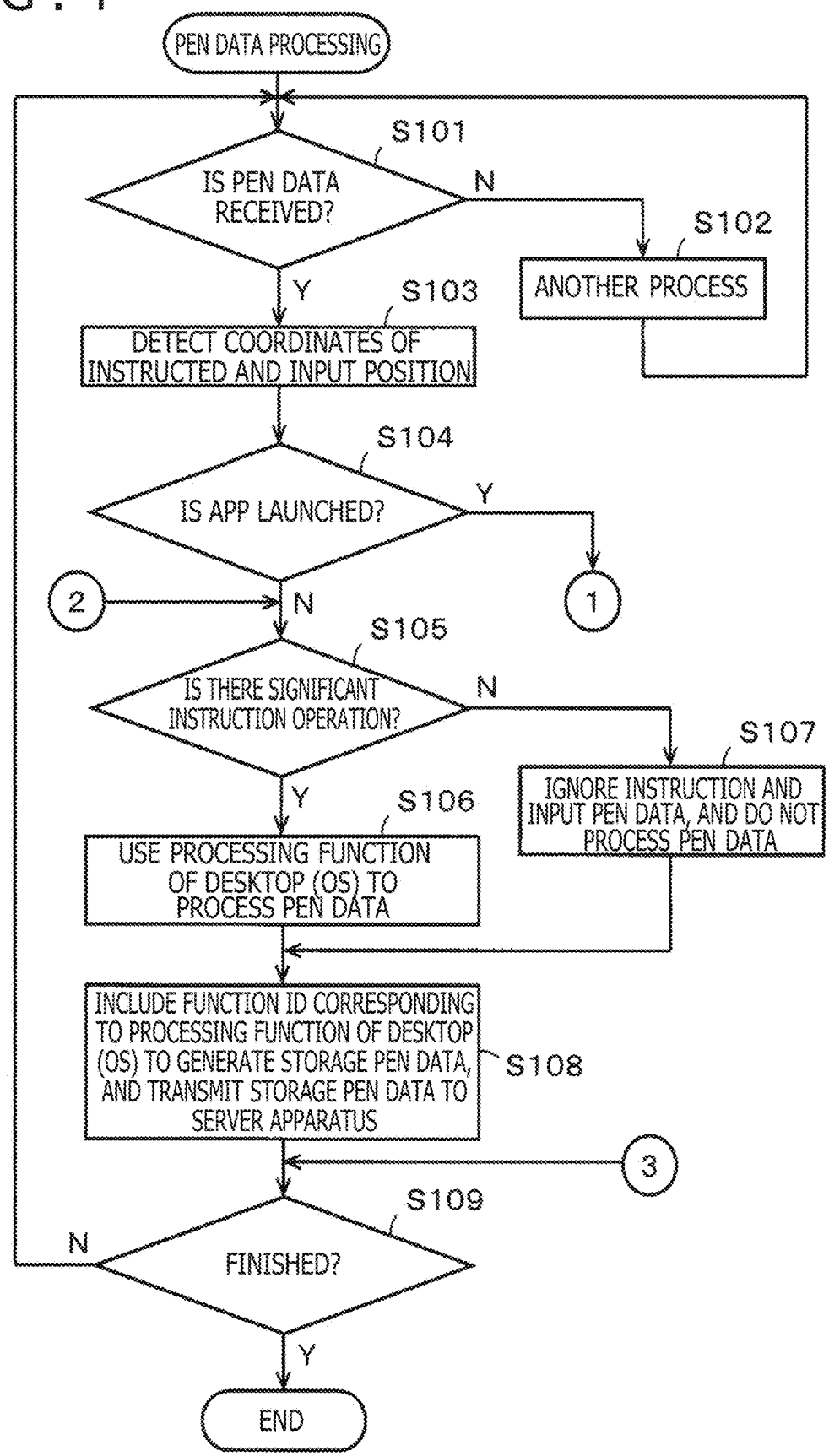
FIG. 4 depicts part of a flow chart for describing a processing action example in the configuration example of the pen input apparatus in the system of the example of FIG. 1.

The control unit 231A advances the process to step S109 of FIG. 4 and repeats the process from step S109.

Note that the entire region of the display screen 23AP of the display 23Adsp of the PC 23A is used as the storage target area of the pen data in the example described above. However, the user in some cases inputs pen data that the user does not want other people to know or pen data that the user does not want to keep. To satisfy such a requirement, a non-storage area of pen data may be provided in the display region of the display screen 23AP of the display 23Adsp of the PC 23A and the position detection region of the position detection sensor 221A of the tablet 22A.

Figure 3D:
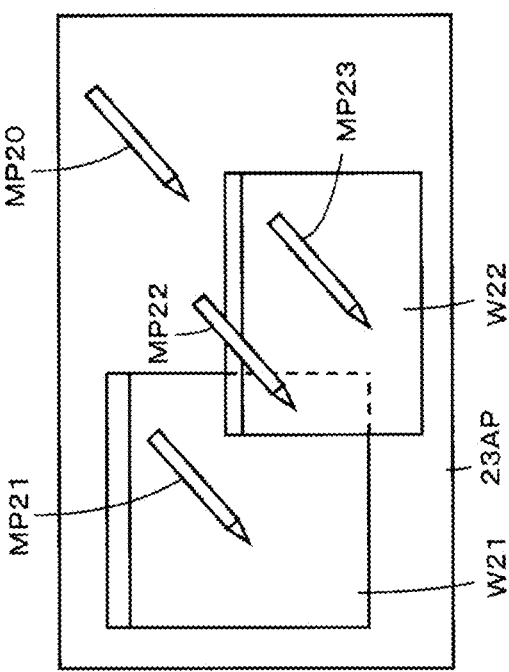

That is, an area indicated by oblique lines in FIG. 3D is a non-storage area NR. The PC 23A receives the instruction input by the electronic pen 21A in the non-storage area (see pen instruction position MP30 of FIG. 3D). The PC 23A does not transmit the pen data to the server apparatus 1 or store the pen data even if the PC 23A uses the processing function of the desktop or app to process the pen data. Note that the PC 23A may be configured to not necessarily process the pen data corresponding to the instruction input by the electronic pen 21 in the non-storage area.

Although the PC 23A includes the display in the pen input apparatus 2A described above, the tablet 22A may include the display. In that case, the position detection sensor 221A and the display are placed one on top of the other in the tablet 22A such that the detection region of the position detection sensor 221A and the display region of the display overlap with each other.

In addition, the display may not be provided, and the tablet 22A may be configured to leave the writing trace of the electronic pen 21A on paper or electronic paper. In that case, the paper or the electronic paper is placed on top of the input surface of the position detection sensor 221A. When the writing trace is to be left on paper, the electronic pen 21A is provided with a function of a writing tool, such as a ballpoint pen, that forms a writing trace on the paper. When electronic paper is to be used, the electronic pen 21A is provided with a function of leaving the writing trace on the electronic paper.

Although the tablet 22A and the PC 23A are connected with a wire in the pen input apparatus 2A in the example of FIG. 2, the tablet 22A and the PC 23A may be wirelessly connected. In that case, the transmission unit 229A of the tablet 22A and the pen data acquisition unit 232A of the PC 23A include wireless communication units such as a near field communication unit of Bluetooth (registered trademark) standard.

In the pen input apparatus 2A of the example, additional information, such as the pen pressure, the state information regarding the side switch 213A, and the information regarding the pen ID, other than the signal for detecting the position instructed by the electronic pen 21A, is also transmitted from the electronic pen 21A to the tablet 22A through the position detection sensor 221A. However, the additional information, such as the pen pressure, the state information regarding the side switch 213A, and the information regarding the pen ID, from the electronic pen 21A may be transmitted to the tablet 22A separately from the position detection signal for detecting the position instructed by the electronic pen 21A. To transmit the additional information, the electronic pen 21A and the tablet 22A may be connected through a connection cable, or wireless communication units, such as a near field communication unit of Bluetooth (registered trademark) standard, may be provided on the electronic pen 21A and the tablet 22A to perform wireless communication. Note that part of the additional information may obviously be transmitted through the position detection sensor 221A along with the position detection signal, instead of all pieces of additional information being transmitted separately from the position detection signal.

Configuration Example of Pen Input Apparatus 2B

The pen input apparatus 2B includes an electronic pen 21B and a pad terminal 22B as an example of an information processing device having a function of a position detection device unit. The configuration of the electronic pen 21B in the pen input apparatus 2B is similar to the configuration of the electronic pen 21A in the pen input apparatus 2A illustrated in FIG. 2, and the electronic pen 21B performs a similar processing action. The configuration of the pad terminal 22B is equivalent to an integrated configuration of the tablet 22A and the PC 23A in the pen input apparatus 2A illustrated in FIG. 2. The processing action executed by the pad terminal 22B is similar to the processing action of the tablet 22A and the PC 23A in the pen input apparatus 2A illustrated in FIG. 2. Therefore, the configuration example and the processing action example of the pen input apparatus 2B will not be described here.

Note that, in the pen input apparatuses 2A and 2B, the information processing unit 233A determines the processing function for processing the pen data, and the function ID of the determined processing function is the function ID of the processing function to be included in the pen data. However, the storage pen data generation unit 237A may use only the acquired pen data to determine the function ID of the processing function to be included in the pen data as follows, regardless of the determination of the processing function in the information processing unit 233A.

Figure 6:
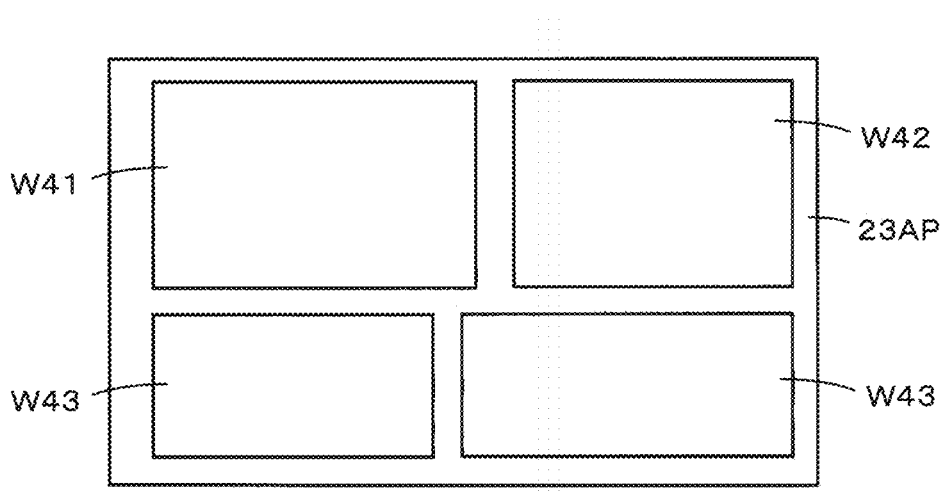
FIG. 6 is a diagram for describing a relation between (a) a display region of the display screen and a position detection sensor detection region and (b) regions of processing apps in the configuration examples of the pen input apparatus and the other pen input apparatus in the system of the example of FIG. 1.

That is, the region of the processing window corresponding to the app is fixed in advance, instead of the region of the processing window being set and the processing window being opened when the information processing unit 233A launches the app as in the embodiment. For example, as illustrated in FIG. 6, a predetermined number of apps, four apps in the example of FIG. 6, are prepared in advance in the display screen 23AP of the display 23Adsp and the detection region of the position detection sensor 221A. The regions of processing windows W41, W42, W43, and W44 of the apps are separately allocated without overlapping of the regions.

In this way, the storage pen data generation unit 237A can refer to the position coordinates of the acquired pen data to determine the region of one of the processing windows W41, W42, W43, and W44 and specify the function ID of the app. Note that, when the app is not launched, the storage pen data generation unit 237A detects that the instruction input is an instruction input on the desktop and determines that the function ID is the function ID of the processing function of the desktop. Hence, the storage pen data generation unit 237A acquires, from the information processing unit 233A, information indicating whether or not the app is launched.

Note that, in the case of the pen input apparatus 2B of the example, it is obvious that all or part of the additional information may also be transmitted from the electronic pen 21B without the involvement of the position detection sensor of the pad terminal 22B. In addition, the display may not be provided, and the pad terminal 22B may be configured to leave the writing trace of the electronic pen 21B on paper or electronic paper.

Although the electronic pens 21A and 21B and the position detection device units are of the electromagnetic resonance type in the pen input apparatuses 2A and 2B, the configuration is not limited to this. For example, the electronic pens and the position detection device units may be of an active capacitive coupling type.

Configuration Example of Pen Input Apparatus 2C

The pen input apparatus 2C is an example of an apparatus that can detect the coordinate information regarding the writing input of the electronic pen, without using the position detection sensor as in the pen input apparatus 2A or the pen input apparatus 2B. The pen input apparatus 2C includes an electronic pen 21C and an information processing terminal 22C.

The electronic pen 21C is provided with a 2-axis or 3-axis acceleration sensor, a gyro sensor, and the like in the example. When the user uses the electronic pen 21C to perform a writing input operation or a drawing input operation on a plane, such as the surface of a desk, the acceleration sensor and the gyro sensor in the electronic pen 21C detect the behavior. The electronic pen 21C transmits the information regarding the detection performed by the acceleration sensor and the gyro sensor to the information processing terminal 22C along with additional information as described later. The additional information includes such information as the pen pressure value applied to the pen tip portion of the electronic pen 21C, the pen ID of the electronic pen 21C, and the state of a side switch Ss, as in the pen input apparatuses 2A and 2B.

In the example, the electronic pen 21C and the information processing terminal 22C communicate through wireless communication units, such as a near field communication unit of Bluetooth (registered trademark) standard. Note that the electronic pen 21C and the information processing terminal 22C may be connected through a connection cable.

The information processing terminal 22C includes a high-performance mobile phone terminal (hereinafter, referred to as a smartphone) in the example, and a processing function for information from the electronic pen 21C as described later is installed in advance as an app.

The information processing terminal 22C has a function of sequentially detecting the position coordinates of the pen tip portion of the electronic pen 21C in reference to the information regarding the detection performed by the acceleration sensor and the gyro sensor and received from the electronic pen 21C, and the information processing terminal 22C also detects the tilt angle of the electronic pen 21C. The method and the configuration of the information processing terminal 22C in detecting the position coordinates of the pen tip portion of the electronic pen 21C in the pen input apparatus 2C of the example are disclosed in, for example, Japanese Patent No. 4292927, and the details will not be described here.

The information processing terminal 22C generates pen data from the additional information received from the electronic pen 21C, in addition to the detected position coordinates and tilt angle.

In the pen input apparatus 2C of the example, the electronic pen 21C has a function of instructing the information processing terminal 22C what kind of processing function is to be used to process the information from the electronic pen 21C. In this case, examples of the processing function that can be selected and used include a writing input processing function of processing the information from the electronic pen 21C as a writing input, a drawing input processing function of processing the information as a drawing input, and a signature input processing function of processing the information as a signature input. The electronic pen 21C includes the function ID of the processing function to be executed by the information processing terminal 22C in the additional information and transmits the additional information to the information processing terminal 22C.

The information processing terminal 22C includes an information processing unit that processes the generated pen data with use of the processing function of the function ID received from the electronic pen 21C. The information processing terminal 22C also has a function of adding the received function ID to the generated pen data to generate storage pen data and transmitting the generated storage pen data to the server apparatus 1 through the communication network NW.

Figure 7:
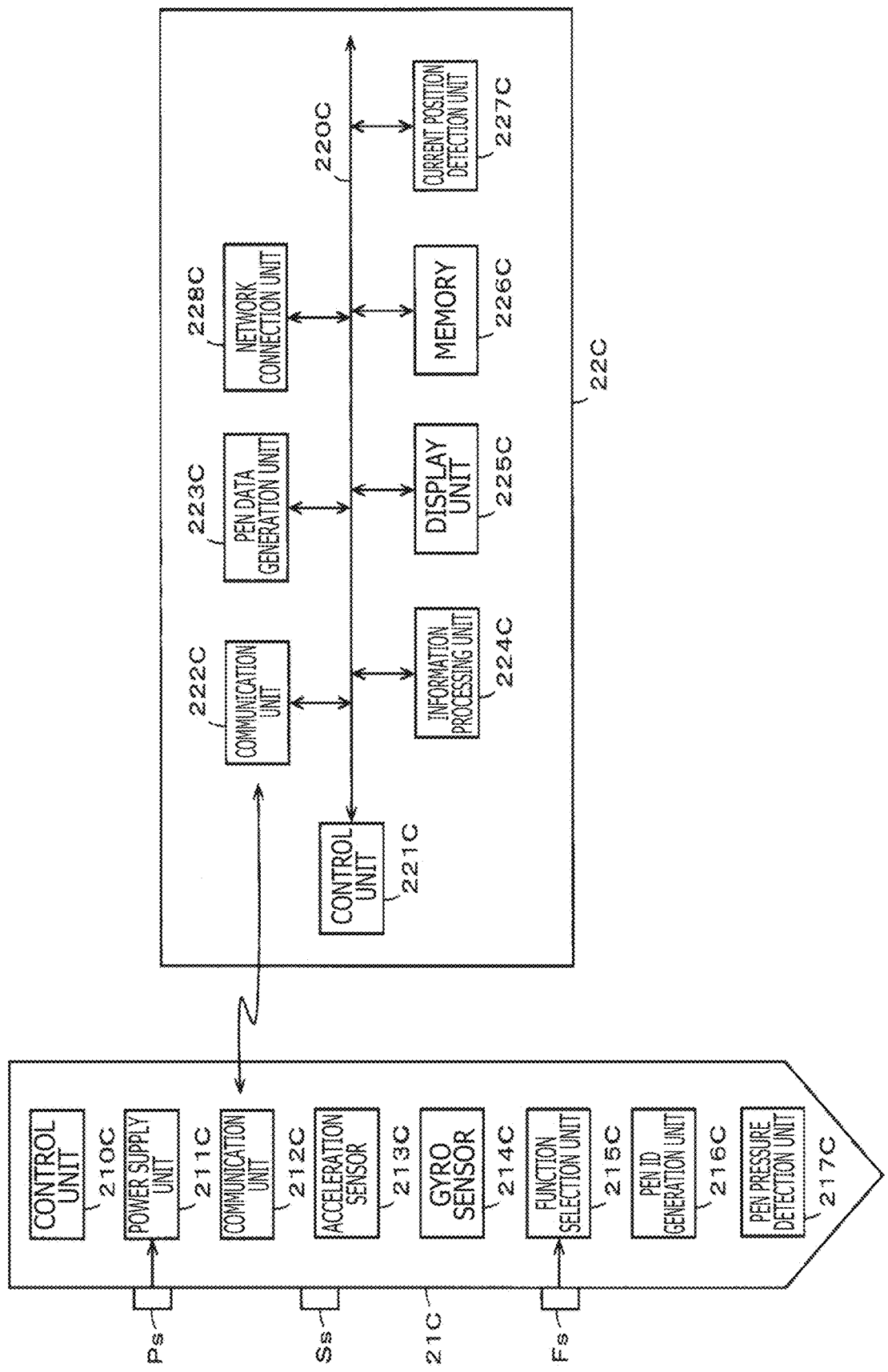
FIG. 7 is a block diagram illustrating a configuration example of yet another pen input apparatus in the system of the example of FIG. 1.

FIG. 7 illustrates an example of constituent parts of main functions of the electronic pen 21C and the information processing terminal 22C of the pen input apparatus 2C of the example related to the disclosure.

Configuration Example of Electronic Pen 21C

The electronic pen 21C of the pen input apparatus 2C in the example includes a power supply unit 211C, a communication unit 212C, an acceleration sensor 213C, a gyro sensor 214C, a function selection unit 215C, a pen ID generation unit 216C, a pen pressure detection unit 217C, and a control unit 210C that are housed in a housing as illustrated in FIG. 7. The housing of the electronic pen 21C is provided with a power supply switch Ps, the side switch Ss, and a function selection operator Fs that can be operated by the user.

The power supply unit 211C includes an unillustrated fixed battery or rechargeable battery. The power supply switch Ps is operated to switch the power-on state and the power-off state, and the supply of power supply voltage to each component in the housing is controlled.

The pen pressure detection unit 217C is configured to detect the pen pressure applied to the pen tip portion of the electronic pen 21C, and the configuration of the pen pressure detection unit 217C can be similar to the configuration of the pen pressure detection circuit 223A of the electronic pen 21A. The configuration of the pen ID generation unit 216C is similar to the configuration of the pen ID generation unit 214A of the electronic pen 21A, and the pen ID generation unit 216 generates a pen ID that is identification information of the electronic pen 21C.

The acceleration sensor 213C and the gyro sensor 214C generate a sensor output corresponding to the movement of the pen tip portion of the electronic pen 21C and a sensor output corresponding to the tilt of the electronic pen 21C. In the example, a 3-axis sensor is used as the acceleration sensor 213C, for example.

The function selection unit 215C receives a selection operation of selecting one of the plurality of processing functions selected by the function selection operator Fs and generates a function ID of the selected processing function. The function selection operator Fs includes a non-lock press button switch, a slide switch, a ring-shaped rotation operator, or the like. When the function selection operator Fs is a non-lock press button switch, the processing function to be selected is changed every time the press button switch is pressed. When the function selection operator Fs is a slide switch or a rotation operator, the processing function is selected according to the slide operation position or the rotation operation position. Note that the electronic pen 21C is provided with an unillustrated display unit or printed marker that indicates the selected processing function to the user.

The control unit 210C has a function of an unillustrated clock unit. The control unit 210C adds, to the sensor output received from the acceleration sensor 213C and the gyro sensor 214C, information regarding time of acquisition of the sensor output and further adds the pen pressure value applied to the pen tip portion of the electronic pen 21C detected by the pen pressure detection unit 217C, the information regarding the state of the side switch Ss, the pen ID from the pen ID generation unit 216C, and the function ID from the function selection unit 215C to the sensor output to generate transmission information. The control unit 210C transmits the generated transmission information to the information processing terminal 22C through the communication unit 212C.

The communication unit 212C in the example includes a wireless communication unit, such as a near field communication unit of Bluetooth (registered trademark) standard. Note that the electronic pen 21C and the information processing terminal 22C may be connected with a wire, such as a universal serial bus (USB) cable.

Configuration Example of Information Processing Terminal 22C

The information processing terminal 22C includes a communication unit 222C, a pen data generation unit 223C, an information processing unit 224C, a display unit 225C, a memory 226C, a current position detection unit 227C, and a network connection unit 228C that are connected to a control unit 221C including a CPU, a program memory, and a work memory through a system bus 220C, as illustrated in FIG. 7.

The communication unit 222C is used for wireless communication with the communication unit 212C of the electronic pen 21C, and the communication unit 222C in the example includes a wireless communication unit such as a near field communication unit of Bluetooth (registered trademark) standard. The communication unit 222C in the example supplies the information received from the electronic pen 21C to the pen data generation unit 223C.

The pen data generation unit 223C detects the coordinates of the pen tip portion of the electronic pen 21C in reference to the sensor output from the acceleration sensor 213C and the gyro sensor 214C acquired from the communication unit 222C and detects sequential coordinates of the writing trace as a movement trajectory of the pen tip portion. The pen data generation unit 223C also detects the tilt angle of the electronic pen 21C in reference to the sensor output from the acceleration sensor 213C and the gyro sensor 214C.

The pen data generation unit 223C includes, in the detected coordinates, the time information received from the electronic pen 21C through the communication unit 222C, the information regarding the pen pressure value, the information regarding the state of the side switch Ss, and the information regarding the detected tilt angle to generate pen data and transfers the pen data to the information processing unit 224C. In this case, the pen data generation unit 223C also supplies the function ID received from the electronic pen 21C through the communication unit 222C to the information processing unit 224C.

The information processing unit 224C uses the processing function corresponding to the received function ID to process the received pen data. The information processing unit 224C displays the result of the executed process on the display screen of the display unit 225C and appropriately stores the result in the memory 226C.

In the embodiment, the pen data generation unit 223C also adds the pen ID and the function ID received from the electronic pen 21C through the communication unit 222C to the generated pen data and further adds the position information regarding the location of the current position detected by the current position detection unit 227C to the generated pen data to generate storage pen data. The pen data generation unit 223C transmits the generated storage pen data to the server apparatus 1 through the network connection unit 228C.

The current position detection unit 227C includes a GPS receiver in the example. The current position detection unit 227C detects the latitude, the longitude, and the altitude of the current position and outputs the detected latitude, longitude, and altitude as position information regarding the current position.

The network connection unit 228C in the example is connected to the communication network NW (Internet) through a wireless network, such as a mobile phone network and Wi-Fi (registered trademark).

Next, processing action examples of the electronic pen 21C and the information processing terminal 22C included in the pen input apparatus 2C will be described.

Example of Main Processing Action of Electronic Pen 21C

Figure 8:
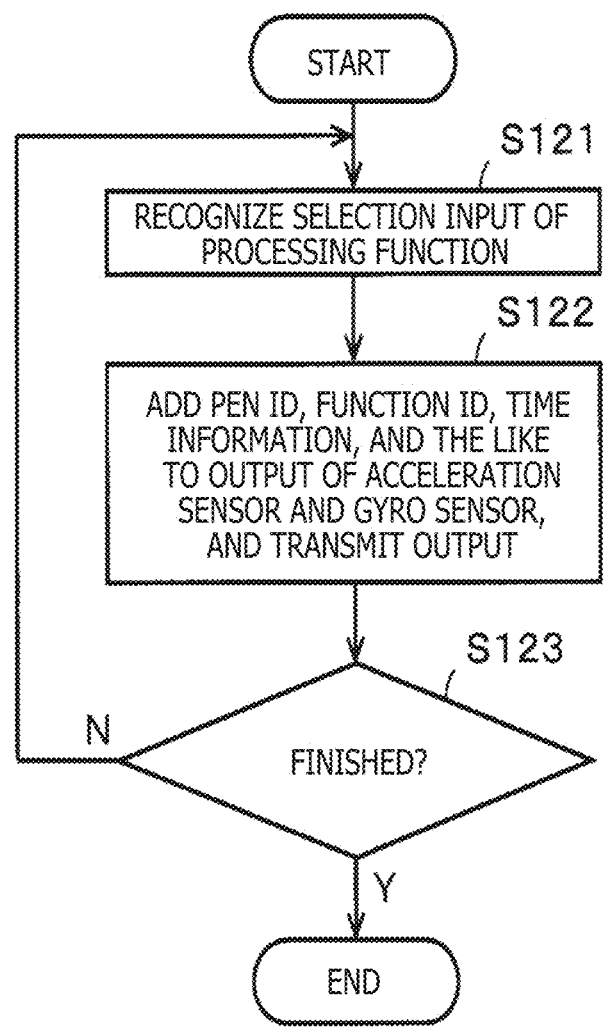
FIG. 8 depicts a flow chart for describing a processing action example of an electronic pen in the yet other pen input apparatus of the example of FIG. 7.

FIG. 8 depicts a flow chart for describing a processing action example of the electronic pen 21C. In the description of FIG. 8, the control unit 210C of the electronic pen 21C executes software programs to carry out the functions of the components illustrated in FIG. 7.

The control unit 210C uses the function of the function selection unit 215C to recognize the processing function selected by the function selection operator Fs (step S121). The control unit 210C adds the pen ID, the information regarding the pen pressure value, the time information, and the function ID of the processing function recognized in step S121 to the sensor output from the acceleration sensor 213C and the gyro sensor 214C and transmits the sensor output to the information processing terminal 22C (step S122).

The control unit 210C determines whether or not an end instruction is given by the power being turned off by the power supply switch Ps, for example (step S123). When the control unit 210C determines that no end instruction is given, the control unit 210C returns the process to step S121 and repeats the process from step S121. When the control unit 210C determines that an end instruction is given, the control unit 210C ends the processing routine.

Example of Flow of Processing Action of Information Processing Terminal 22C

Figure 9:
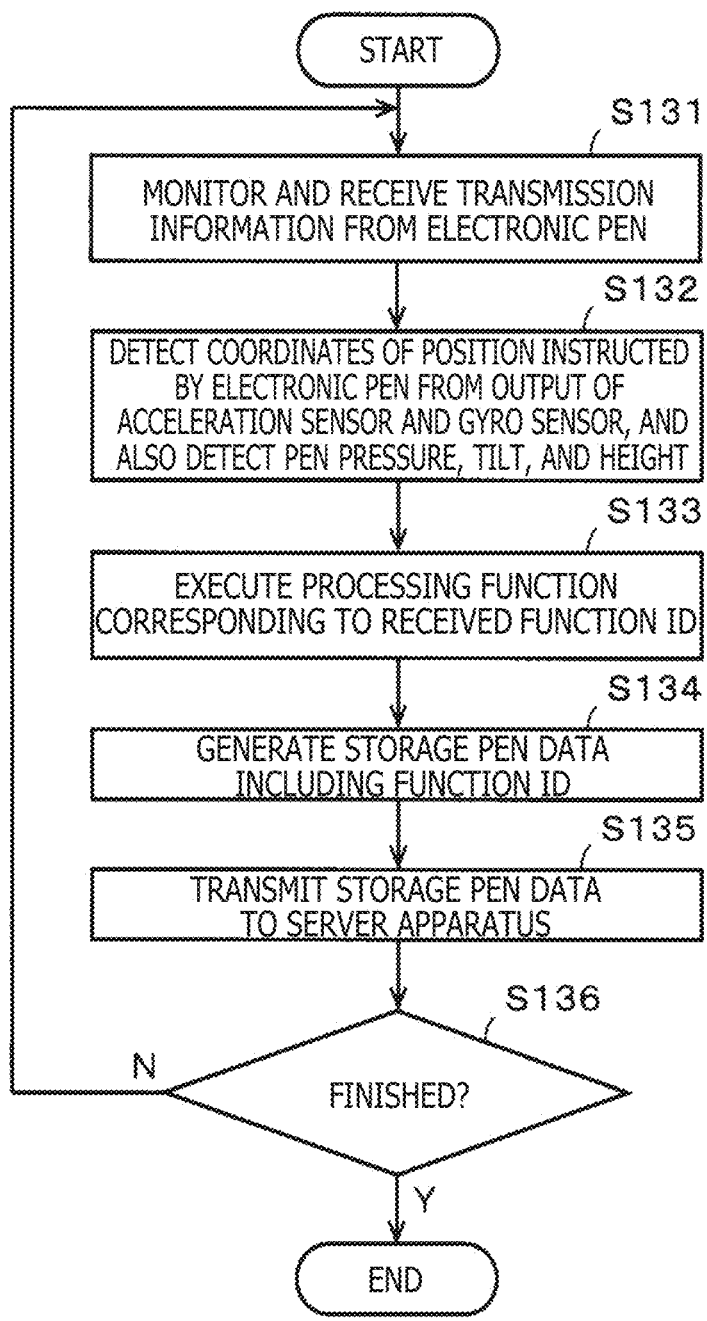
FIG. 9 depicts a flow chart for describing a processing action example of an information processing terminal in the yet other pen input apparatus of the example of FIG. 7.

FIG. 9 depicts a flow chart for describing a processing action example of the information processing terminal 22C. In the description of FIG. 9, the control unit 221C of the information processing terminal 22C executes software programs to carry out the functions of the components illustrated in FIG. 7.

The control unit 221C monitors and receives the transmission information from the electronic pen 21C (step S131). The control unit 221C uses the function of the information processing unit 224C to detect the position coordinates of the pen tip portion of the electronic pen 21C and the tilt angle of the electronic pen 21C from the sensor output from the acceleration sensor 213C and the gyro sensor 214C in the received transmission information and includes the pen pressure value, the information regarding the side switch Ss, and the like in the sensor output to generate pen data (step S132).

The control unit 221C uses the processing function of the received function ID to process the generated pen data (step S133). The control unit 221C adds the received function ID and the pen ID to the pen data generated in step S132 and adds the position information regarding the location of the current position to the pen data to generate storage pen data (step S134). The control unit 221C transmits the storage pen data generated in step S134 to the server apparatus 1 (step S135).

The control unit 221C determines whether or not an end instruction is given (step S136). When the control unit 221C determines that no end instruction is given, the control unit 221C returns the process to step S131 and repeats the process from step S131. When the control unit 221C determines that an end instruction is given, the control unit 221C ends the processing routine.

Although the information processing terminal 22C processes the transmission information from the electronic pen 21C in the example of the pen input apparatus 2C, the information processing terminal 22C may be configured to execute only a process of generating the storage pen data from the transmission information without processing the transmission information and then transmitting the storage pen data to the server apparatus 1.

In that case, the user of the electronic pen 21C later accesses the server apparatus 1 to make an acquisition request for the storage pen data including the pen ID of the electronic pen 21C, the time and the location of the instruction input, and the like and thereby acquire the storage pen data from the server apparatus 1. The user can apply information processing to the acquired storage pen data as in the information processing in the information processing unit 224C to reproduce a processing result similar to the processing result in the example.

Note that the information processing terminal 22C does not have to be provided with the information processing unit 224C and the memory 226C in such a configuration. The electronic pen 21C may be provided with the functional unit of the information processing terminal 22C for generating the storage pen data and transmitting the storage pen data to the server apparatus 1. In this way, the user can use the electronic pen 21C to perform an instruction input operation at any time and any location and transmit the storage pen data to the server apparatus 1. The user can later acquire the storage pen data and use the processing function corresponding to the function ID included in the storage pen data to process the storage pen data (pen data) and reproduce the process.

Although the acceleration sensor 213C and the gyro sensor 214C are used as units for detecting the coordinates of the pen tip portion of the electronic pen 21C in the electronic pen 21C of the pen input apparatus 2C, an imaging element (camera) may be provided near the pen tip portion in place of the acceleration sensor 213C and the gyro sensor 214C or in addition to the acceleration sensor 213C and the gyro sensor 214C, and a captured image of the imaging element may also be used.

Note that the movement detection sensors (motion sensors) as units for detecting the coordinates of the pen tip portion of the electronic pen 21C are not limited to the acceleration sensor 213C and the gyro sensor 214C.

Configuration Example of Server Apparatus 1

The server apparatus 1 in the embodiment can not only store the storage pen data from the pen input apparatuses 2A, 2B, and 2C, and the like, but also use the stored storage pen data to provide various services. In examples described below, an electronic signature authentication service and a character recognition service will particularly be described as examples of the provided services.

The electronic signature authentication service is a service for determining whether or not a writing trace of a signature can be authenticated as a writing trace of the person in reference to the storage pen data received by the server apparatus 1 and providing the determination result. The character recognition service is a service for recognizing a handwriting character in reference to the storage pen data received by the server apparatus 1 and providing corresponding character text data. Note that, when the user executes an electronic signature app or a handwriting character recognition app in the example, the user uses an electronic pen that is set for the user.

In the embodiment, the server apparatus 1 can detect the function ID included in the storage pen data, to determine whether the processing function that has processed or that will process the received storage pen data is an app of electronic signature or an app of character recognition. Hence, when the server apparatus 1 in the embodiment determines that the function ID included in the received storage pen data is the function ID of the app of electronic signature or the function ID of the app of character recognition, the server apparatus 1 stores the storage pen data and executes the electronic signature service or the character recognition service.

In the embodiment, the server apparatus 1 can also receive an information acquisition request including a keyword, such as the pen ID, the function ID, the time information, and the position information regarding the location included in the storage pen data, and perform an information providing service corresponding to the information acquisition request. The information acquisition request in the example here is a request for acquiring the storage pen data including the keyword included in the information acquisition request.

The keyword included in the information providing request here may be one of the coordinates, the pen pressure value, the state of the side switch, the tilt angle, the time, the location (position information), the pen ID, and the function ID included in the storage pen data of the example or may be a word obtained by extracting and combining two or more of them.

Figure 10:
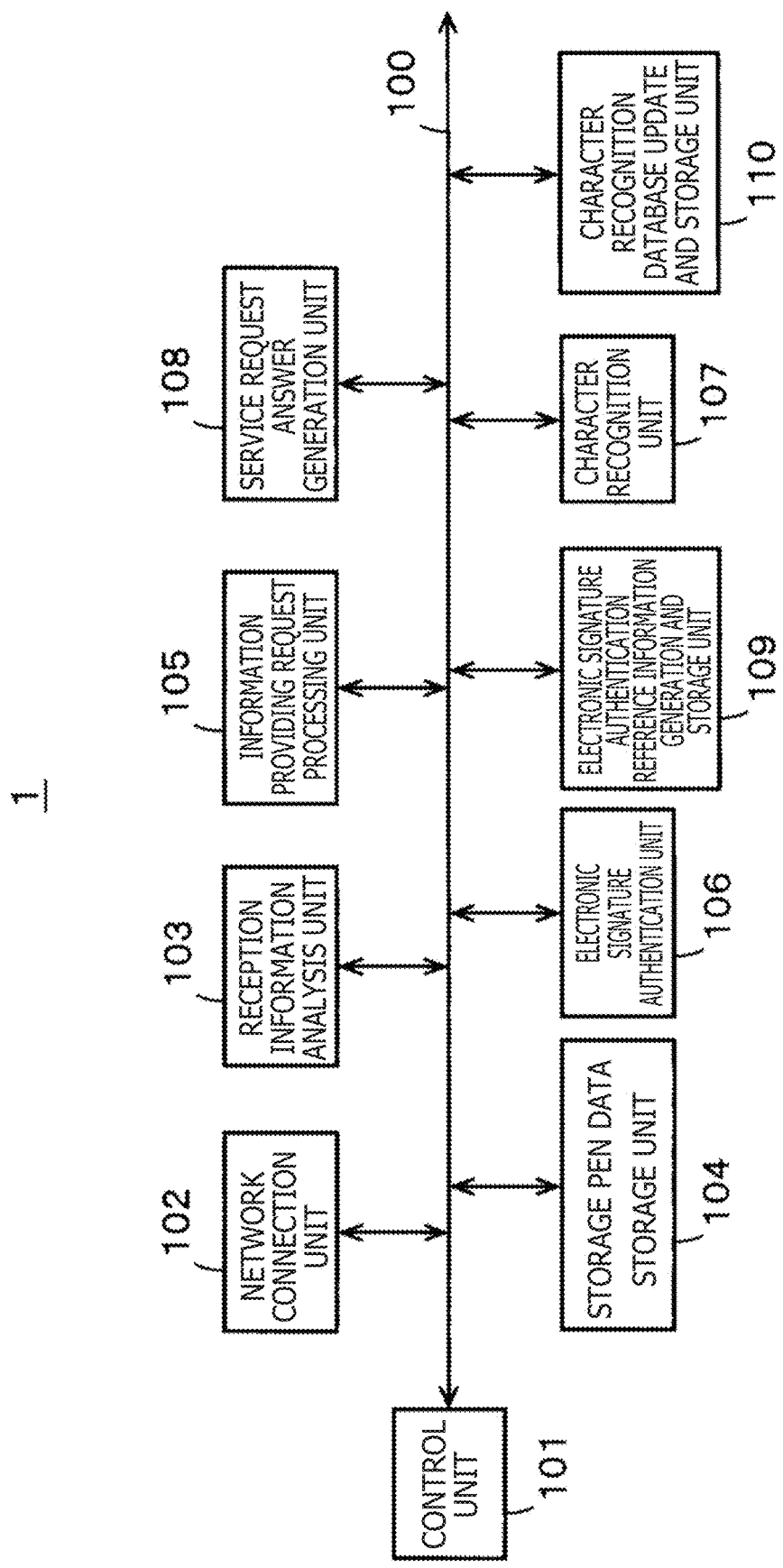
FIG. 10 is a block diagram illustrating a configuration example of a server apparatus in the system of the example of FIG. 1.

FIG. 10 is a functional block diagram of the configuration example of the server apparatus 1 in the embodiment. As illustrated in FIG. 10, the server apparatus 1 includes a network connection unit 102, a reception information analysis unit 103, a storage pen data storage unit 104, an information providing request processing unit 105, an electronic signature authentication unit 106, a character recognition unit 107, a service request answer generation unit 108, an electronic signature authentication reference information generation and storage unit 109, and a character recognition database update and storage unit 110 that are connected to a control unit 101 including a CPU, a program memory, and a work memory, through a system bus 100.

The network connection unit 102 is connected to the communication network NW, and the network connection unit 102 executes a process of receiving the storage pen data from the pen input apparatuses 2A, 2B, and 2C or the like and the information acquisition request from the information processing device such as a PC and transmitting, through the communication network NW, the transmission information corresponding to the provided service to the partner apparatus that has requested for the service. The network connection unit 102 transfers the received reception information to the reception information analysis unit 103.

The reception information analysis unit 103 analyzes the information received from the network connection unit 102, and when the reception information is the storage pen data, the reception information analysis unit 103 transfers the received storage pen data to the storage pen data storage unit 104. When the reception information is the storage pen data, the reception information analysis unit 103 further determines the function ID included in the storage pen data. When the reception information analysis unit 103 determines that the function ID is the function ID of the electronic signature app, the reception information analysis unit 103 activates the electronic signature authentication unit 106 and the electronic signature authentication reference information generation and storage unit 109 and also transfers the storage pen data to the electronic signature authentication unit 106 and the electronic signature authentication reference information generation and storage unit 109. When the control unit 101 determines that the function ID is the function ID of the character recognition app, the control unit 101 activates the character recognition unit 107 and the character recognition database update and storage unit 110 and transfers the storage pen data to the character recognition unit 107 and the character recognition database update and storage unit 110.

When the reception information analysis unit 103 determines that the reception information is the information providing request as a result of the analysis of the information received by the network connection unit 102, the reception information analysis unit 103 transfers the received information providing request to the information providing request processing unit 105.

The storage pen data storage unit 104 stores the received storage pen data in the memory. In this case, the storage pen data storage unit 104 in the example sorts the storage pen data by pen ID included in the storage pen data and stores the storage pen data.

The information providing request processing unit 105 determines the keyword included in the received information providing request. The information providing request processing unit 105 reads the storage pen data including the determined keyword from the storage pen data storage unit 104 and transfers the storage pen data to the service request answer generation unit 108.

The keyword included in the information providing request is one of the coordinates, the pen pressure value, the state of the side switch, the tilt angle, the time, the location (position information), the pen ID, and the function ID included in the storage pen data of the example or a word obtained by extracting and combining two or more of them.

For example, when the keyword includes only the pen ID in the information providing request, all pieces of storage pen data including the pen ID are read from the storge pen data storage unit 104 and transferred to the service request answer generation unit 108. When the keyword includes the pen ID and the designation of a predetermined period regarding time in the information providing request, the storage pen data including the pen ID and including the information regarding the time in the designated period is read from the storage pen data storage unit 104 and transferred to the service request answer generation unit 108.

The service request answer generation unit 108 generates answer information from the requested storage pen data transmitted in the process of the information providing request processing unit 105 and transmits the answer information to the partner that has requested for the information, through the communication network NW.

The electronic signature authentication unit 106 authenticates whether or not the signature in the storage pen data is a signature of the owner of the electronic pen identified by the pen ID, in reference to the storage pen data received from the reception information analysis unit 103 and the authentication reference information stored in the electronic signature authentication reference information generation and storage unit 109. In this case, the writing trace of the electronic signature character based on the changes in the coordinates, the pen pressure value, and the tilt angle in chronological order that are information related to the writing trace in the storage pen data is authenticated in the authentication of the electronic signature.

The electronic signature authentication unit 106 supplies the information regarding the authentication result of the electronic signature to the service request answer generation unit 108. When the service request answer generation unit 108 receives the information regarding the electronic signature authentication result from the electronic signature authentication unit 106, the service request answer generation unit 108 transmits the information to the partner that has transmitted the storage pen data including the function ID of the electronic signature app.

The electronic signature authentication reference information generation and storage unit 109 generates electronic signature authentication reference information for each user for each pen ID from the storage pen data acquired in the past authentication process of electronic signature and stores the electronic signature authentication reference information. Every time the electronic signature authentication process is executed, the electronic signature authentication reference information generation and storage unit 109 uses the storage pen data acquired in the process to update the electronic signature authentication reference information and generate the electronic signature authentication reference information again. Hence, old habits of the user and changes in the writing trace are reflected on the electronic signature authentication reference information stored in the electronic signature authentication reference information generation and storage unit 109, and this can improve the accuracy of the electronic signature authentication.

The character recognition unit 107 recognizes text character electronic data corresponding to the handwriting input character in the received storage pen data, in reference to the storage pen data received from the reception information analysis unit 103 and character authentication table data stored in the character recognition database update and storage unit 110. The character recognition unit 107 also performs the character recognition of the writing trace of the handwriting input character based on the changes in the coordinates, the pen pressure value, and the tilt angle in chronological order that are information related to the writing trace in the storage pen data.

The character recognition database update and storage unit 110 generates feature data regarding the handwriting input characters of each user for each pen ID and character recognition table data, which is a correspondence table of the feature data and text character electronic data, from the storage pen data acquired in the past process of character recognition and stores them. Every time the process of character recognition is executed, the character recognition database update and storage unit 110 uses the storage pen data acquired in the process and updates the feature data regarding the handwriting input characters of the user for each pen ID to update the character recognition table data. Hence, old habits of the user and changes in the writing trace are reflected on the character recognition table data stored in the character recognition database update and storage unit 110, and the character recognition can constantly be performed more accurately.

The character recognition unit 107 supplies the information regarding the character recognition result to the service request answer generation unit 108. When the service request answer generation unit 108 receives the information regarding the character recognition result from the character recognition unit 107, the service request answer generation unit 108 transmits the information to the partner that has transmitted the storage pen data including the function ID of the character recognition app.

Note that the example is based on the assumption that the electronic pen used in the electronic signature and the character recognition is different for each user and that the electronic pen to be used is set for each user. However, in the apps of the electronic signature and the character recognition, an individual ID for specifying the individual to be authenticated can be added and included in the pen ID when the pen input apparatus transmits the storage pen data including the function ID of the app. In this way, the electronic signature of the user can be authenticated even when the user uses electronic pens with different pen IDs.

In that case, electronic signature authentication reference information for each individual ID is generated and stored in the electronic signature authentication reference information generation and storage unit 109, and character recognition table data for each individual ID is generated and stored in the character recognition database update and storage unit 110. The electronic signature authentication unit 106 executes the electronic signature authentication for each user identified by the individual ID, and the character recognition unit 107 executes the character recognition for each user identified by the individual ID.

Processing Action Example of Server Apparatus 1

A processing action example of the server apparatus 1 will next be described. FIGS. 11 to 14 each depict a flow chart for describing the processing action example of the server apparatus 1. In the description of FIGS. 11 to 14, the control unit 101 of the server apparatus 1 executes software programs to carry out the functions of the reception information analysis unit 103, the information providing request processing unit 105, the electronic signature authentication unit 106, the character recognition unit 107, and the service request answer generation unit 108 that are illustrated in FIG. 10.

The control unit 101 of the server apparatus 1 determines whether or not the storage pen data is received through the network connection unit 102 (step S201). When the control unit 101 determines that the storage pen data is not received, the control unit 101 determines whether or not the information providing request is received (step S207). When the control unit 101 determines in step S207 that the information providing request is not received, the control unit 101 returns the process to step S201.

When the control unit 101 determines in step S201 that the storage pen data is received through the network connection unit 102, the control unit 101 detects the function ID included in the storage pen data (step S202) and determines whether or not the function ID is the function ID of the electronic signature app (step S203). When the control unit 101 determines in step S203 that the detected function ID is not the function ID of the electronic signature app, the control unit 101 determines whether or not the detected function ID is the function ID of the character recognition app (step S204).

When the control unit 101 determines in step S204 that the detected function ID is not the function ID of the character recognition app, the control unit 101 detects the pen ID included in the received storage pen data (step S205). The control unit 101 stores the received storage pen data in the area of the storage pen data storage unit 104 corresponding to the pen ID detected in step S205 (step S206). After step S206, the control unit 101 returns the process to step S201 and repeats the process from step S201.

When the control unit 101 determines in step S203 that the function ID detected in step S202 is the function ID of the electronic signature app, the control unit 101 detects the pen ID included in the received storage pen data (step S211 of FIG. 12) and acquires the electronic signature authentication reference information corresponding to the detected pen ID from the electronic signature authentication reference information generation and storage unit 109 (step S212).

The control unit 101 then uses the acquired electronic signature authentication reference information to execute the authentication process for the electronic signature regarding the received storage pen data (step S213) and transmits the authentication result to the partner that has transmitted the storage pen data including the function ID of the electronic authentication (step S214).

The control unit 101 stores all pieces of storage pen data including the received function ID of the electronic authentication app in the storage area of the storage pen data storage unit 104 corresponding to the pen ID detected in step S211 (step S215). The control unit 101 uses the storage pen data including the received function ID of the electronic authentication app to update the electronic signature authentication reference information in the electronic signature authentication reference information generation and storage unit 109 corresponding to the pen ID detected in step S211 (step S216). After step S216, the control unit 101 returns the process to step S201 and repeats the process from step S201.

When the control unit 101 determines in step S204 that the detected function ID is the function ID of the character recognition app, the control unit 101 detects the pen ID included in the received storage pen data (step S221 of FIG. 13) and acquires the character recognition table data corresponding to the detected pen ID from the character recognition database update and storage unit 110 (step S222).

The control unit 101 then uses the acquired character recognition table data to execute the character recognition process regarding the received storage pen data (step S223) and transmits the character recognition result to the partner that has transmitted the storage pen data including the function ID of the character recognition app (step S224).

The control unit 101 stores all pieces of storage pen data including the received function ID of the character recognition app in the storage area of the storage pen data storage unit 104 corresponding to the pen ID detected in step S221 (step S225). The control unit 101 uses the storage pen data including the received function ID of the character recognition app to update the character recognition table data in the character recognition database update and storage unit 110 corresponding to the pen ID detected in step S221 (step S226). After step S226, the control unit 101 returns the process to step S201 and repeats the process from step S201.

Figure 11:
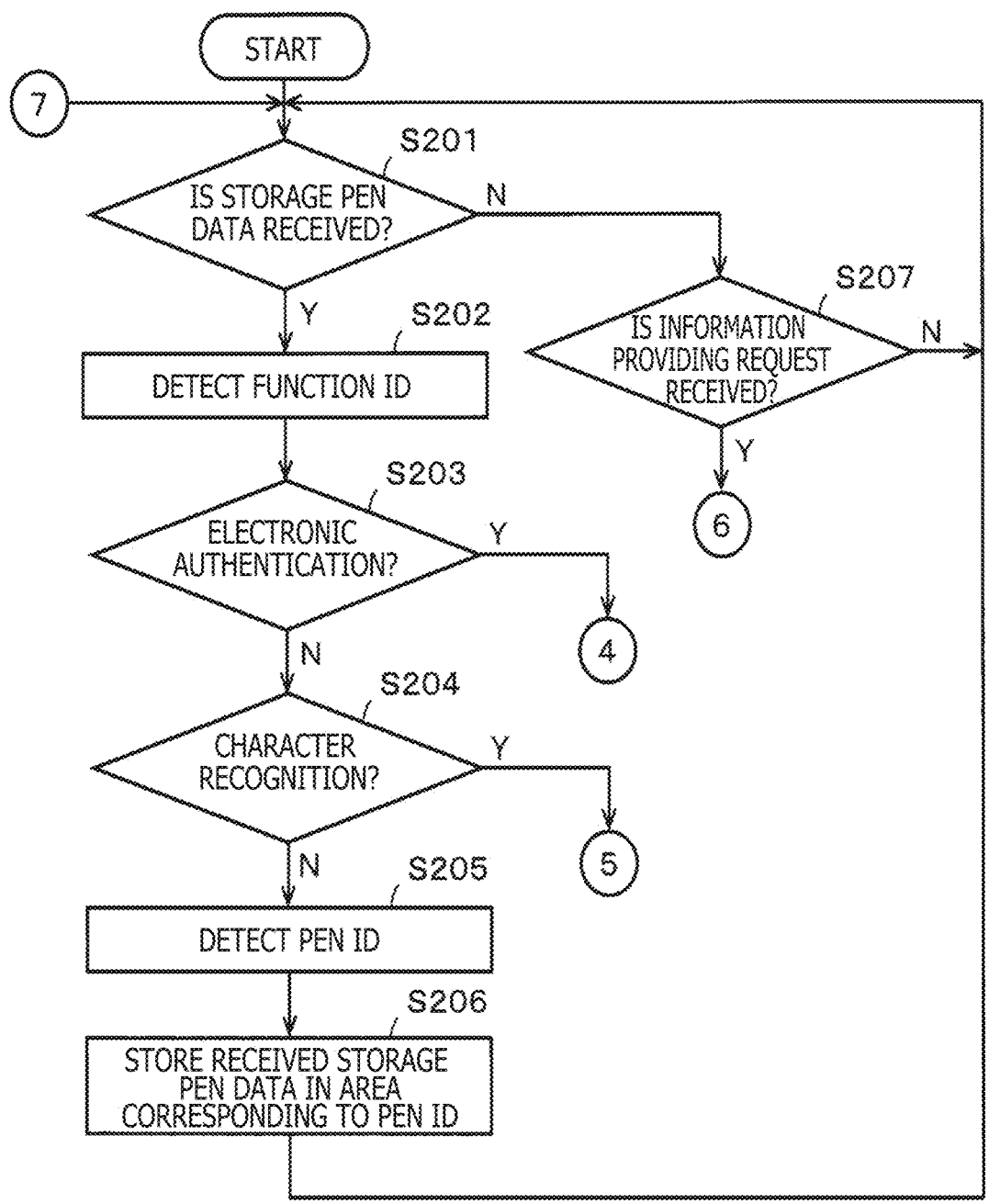
FIG. 11 depicts part of a flow chart for describing a processing action example of the server apparatus in the example of FIG. 10.
Figure 12:
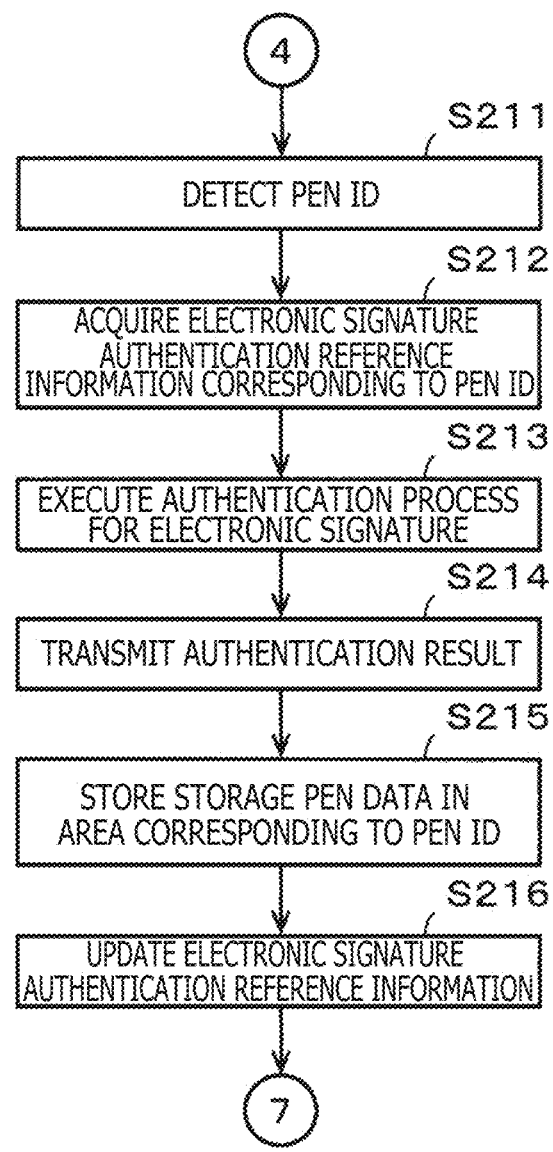
FIG. 12 depicts part of the flow chart for describing the processing action example of the server apparatus in the example of FIG. 10.
Figure 13:
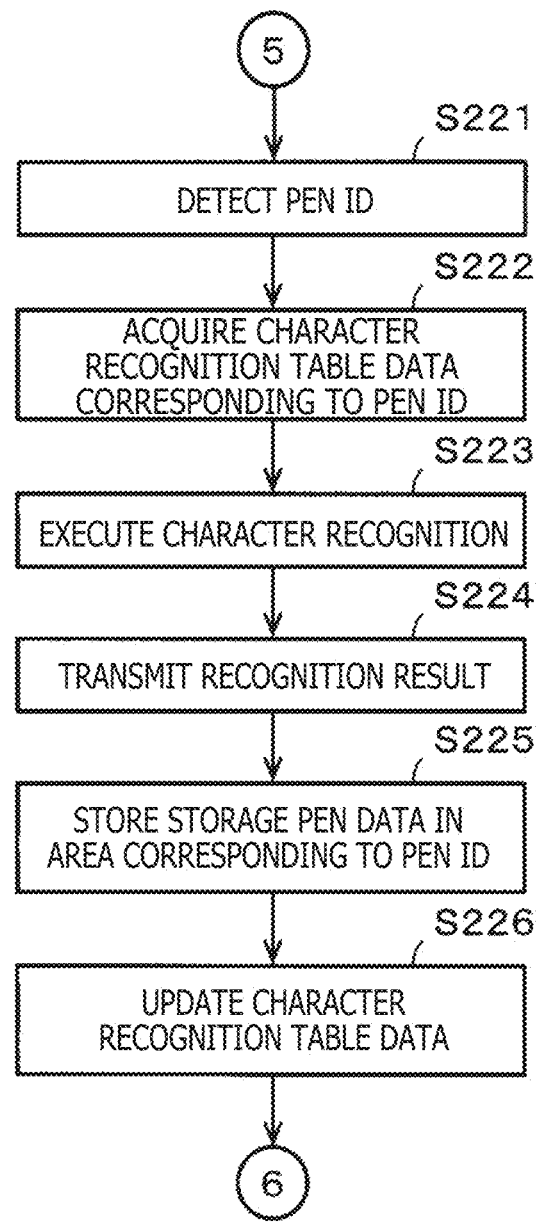
FIG. 13 depicts part of the flow chart for describing the processing action example of the server apparatus in the example of FIG. 10.
Figure 14:
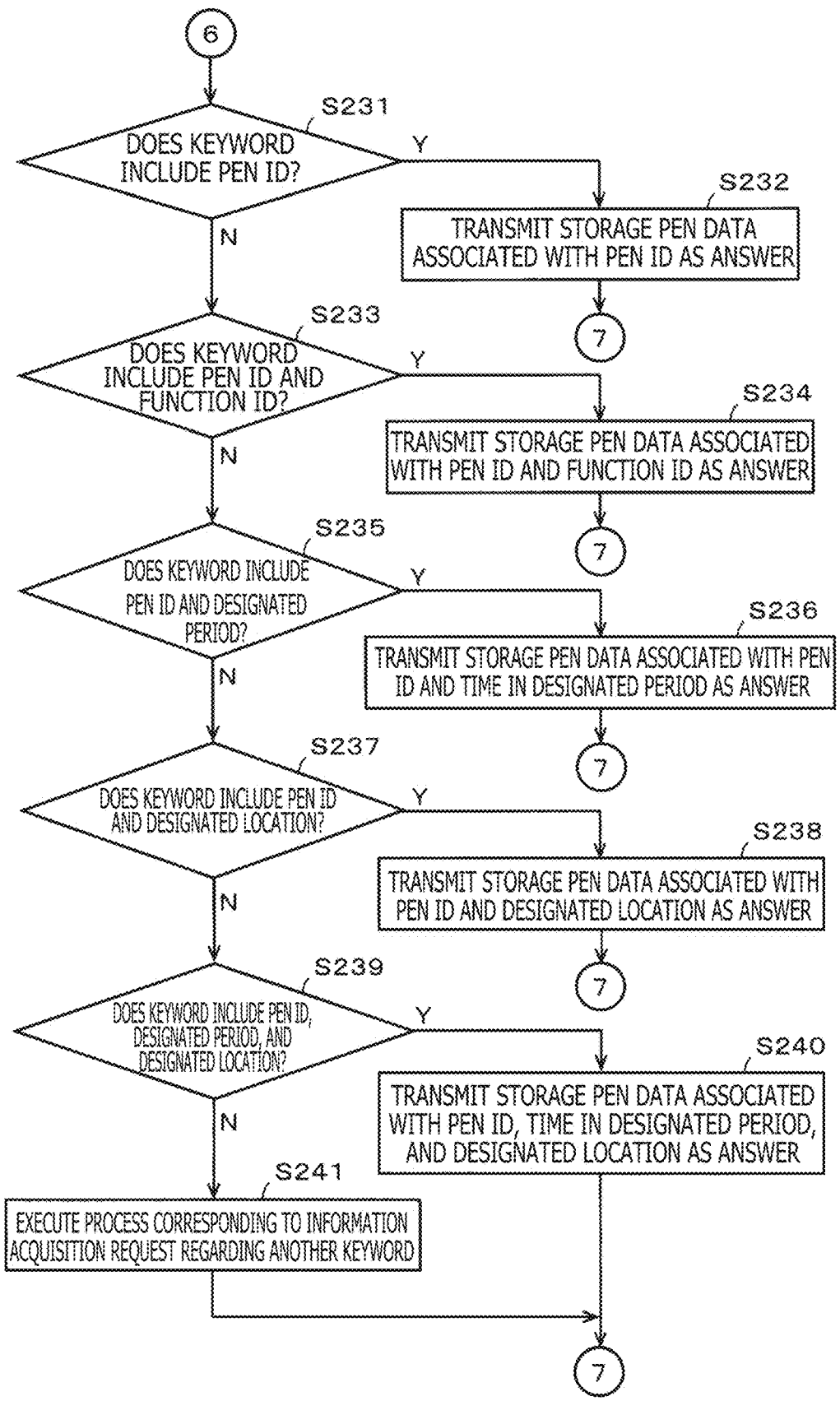
FIG. 14 depicts part of the flow chart for describing the processing action example of the server apparatus in the example of FIG. 10.

When the control unit 101 determines in step S207 of FIG. 11 that the information providing request is received, the control unit 101 determines whether or not the keyword included in the received information providing request includes only the pen ID (step S231 of FIG. 14). When the control unit 101 determines in step S231 that the keyword includes only the pen ID, the control unit 101 acquires all pieces of storage pen data stored in association with the pen ID from the storage pen data storage unit 104 and transmits the pieces of storage pen data to the partner that has requested for the information (step S232). After step S232, the control unit 101 returns the process to step S201 and repeats the process from step S201.

When the control unit 101 determines in step S231 that the keyword included in the received information providing request includes not only the pen ID, the control unit 101 determines whether or not the keyword includes the pen ID and the function ID (step S233). When the control unit 101 determines in step S233 that the keyword includes the pen ID and the function ID, the control unit 101 acquires all pieces of storage pen data that are stored in association with the pen ID and that include the function ID from the storage pen data storage unit 104 and transmits the pieces of storage pen data to the partner that has requested for the information (step S234). After step S234, the control unit 101 returns the process to step S201 and repeats the process from step S201.

When the control unit 101 determines in step S233 that the keyword included in the received information providing request does not include the pen ID and the function ID, the control unit 101 determines whether or not the keyword includes the pen ID and a designated period (step S235). The designated period may be a designation of a period from a point of time (a point of time can be designated by year, month, day, hour, minute, and second) to another point of time or may be a designation of a specific point of time. When the control unit 101 determines in step S235 that the keyword includes the pen ID and the designated period, the control unit 101 acquires all pieces of the storage pen data that are stored in association with the pen ID and that include the time information in the designated period from the storage pen data storage unit 104 and transmits the pieces of storage pen data to the partner that has requested for the information (step S236). After step S236, the control unit 101 returns the process to step S201 and repeats the process from step S201.

When the control unit 101 determines in step S235 that the keyword included in the received information providing request does not include the pen ID and the designated period, the control unit 101 determines whether or not the keyword includes the pen ID and a designated location (step S237). The designated location may be a designation of a specific location (specific position information) or may be a designation of a predetermined position range. When the position range designated in this case is, for example, a circular range, the center position of the circular range and the radius from the center position are designated. When the designated position range is a rectangular range, two positions of diagonals of the rectangular range are designated. In addition, a plurality of angular positions may be designated to designate a range in which the plurality of angular positions are connected by straight lines.

When the control unit 101 determines in step S237 that the keyword includes the pen ID and the designated location, the control unit 101 acquires all pieces of storage pen data that are stored in association with the pen ID and that include the position information corresponding to the designated location or the designated range from the storage pen data storage unit 104 and transmits the pieces of storage pen data to the partner that has requested for the information (step S238). After step S238, the control unit 101 returns the process to step S201 and repeats the process from step S201.

When the control unit 101 determines in step S237 that the keyword included in the received information providing request does not include the pen ID and the designated location, the control unit 101 determines whether or not the keyword includes the pen ID, the designated period, and the designated location (step S239). The designated period and the designated location are as described above.

When the control unit 101 determines in step S239 that the keyword includes the pen ID, the designated period, and the designated location, the control unit 101 acquires, from the storage pen data storage unit 104, all pieces of storage pen data that are stored in association with the pen ID, that include the time information in the designated period, and that include the position information corresponding to the designated location or the designated range and transmits the pieces of storage pen data to the partner that has requested for the information (step S240). After step S240, the control unit 101 returns the process to step S201 and repeats the process from step S201.

When the control unit 101 determines in step S239 that the keyword included in the received information providing request does not include the pen ID, the designated period, and the designated location, the control unit 101 determines that another keyword is included and executes a process corresponding to the information acquisition request regarding the other keyword (step S241). After step S241, the control unit 101 returns the process to step S201 and repeats the process from step S201.

Advantageous Effects of Embodiment

In this way, each piece of the storage pen data acquired from the server apparatus 1 includes the function ID. Hence, the information processing device, such as a PC, that has acquired the storage pen data can specify and launch the processing function for processing the storage pen data according to the function ID. The information processing device can use the launched processing function to process the storage pen data and easily restore the processing result of the storage pen data.

In the embodiment, the processing functions identified by the function IDs include not only the processing function of the processing app, but also the processing function of the desktop (function of OS) as described above. Accordingly, the history of the instruction input by the electronic pen performed by the user on the display screen of the desktop can also be reproduced. In that case, the processing function of the desktop in the embodiment also stores, as the storage pen data, the pen data not subject to any processing in response to the instruction input by the electronic pen, and this can also reproduce a situation in which the user is operating the electronic pen on the desktop while thinking or hesitating.

In the embodiment, the storage pen data includes the information regarding time (time stamp) of acquisition of the storage pen data. Hence, the information processing device, such as a personal computer, that has acquired the storage pen data can use the processing functions (OS and app) corresponding to the function ID to process the storage pen data in chronological order based on the time information included in the storage pen data and thereby restore the flow of processing of the storage pen data.

In the pieces of storage pen data sequentially stored in chronological order, a sequential pen data group including the same function ID can be recognized as one group of pen data to be processed with the function ID, and the one group of pen data can be processed by an appropriate processing application to restore the processing result by the one group of pen data.

As described in the example of the flow of the processing action in the server apparatus 1, the information providing requester can acquire all pieces of pen data instructed and input in the past by the specific electronic pen identified by the pen ID when the information providing requester includes the pen ID as a keyword of the information acquisition request (see step S232). Hence, the information providing requester can reproduce the information processing based on the acquired storage pen data to reproduce and recognize when, where, and what kind of information processing the user of the electronic pen with the pen ID has executed with use of the pen data, which is convenient.

The information providing requester that has acquired the storage pen data provided from the server apparatus 1 in step S234 can reproduce the storage pen data including the keyword of the pen ID and the function ID to recognize when, where, and how the user of the electronic pen with the pen ID has executed the processing function identified by the function ID, which is convenient.

The information providing requester that has received the storage pen data provided from the server apparatus 1 in step S236 can recognize where and what kind of processing function the user of the electronic pen with the pen ID has launched to execute processing in the designated period, which is convenient.

The information providing requester that has acquired the storage pen data provided from the server apparatus 1 in step S240 can recognize what kind of processing function the user of the electronic pen with the pen ID has launched to execute processing in the designated period, at the designated location, which is convenient.

In the case of the processing function of electronic signature authentication, character recognition, or the like, a large amount of stored storage pen data may need to be used to generate information that may be necessary for the process, such as electronic signature authentication reference information and character recognition table data, and the information may need to be used to execute a special auxiliary process, such as an authentication process and a recognition process. In the embodiment, the server apparatus can be configured to execute the auxiliary process, and the storage pen data including the function ID can be transmitted to the server apparatus. In this way, the server apparatus can automatically execute the auxiliary process.

That is, the server apparatus can have a function of generating auxiliary information for partially executing the processing function with use of the large amount of stored storage pen data and using the auxiliary information to execute the auxiliary process. The storage pen data including the function ID can be transmitted to the server apparatus, and the process can be executed in cooperation with the server apparatus.

In the embodiment, when an area in which the instruction input by the electronic pen is not transmitted as storage pen data to the server apparatus 1 is provided in the input region of the input surface of the pen input apparatus as illustrated in FIG. 3D, the user can also input information input by the electronic pen not to be stored.

In the case of the system configuration using the example of the pen input apparatus 2C, the storage pen data can be transmitted to the server apparatus 1 without processing the information regarding the pen data according to the instruction input by the electronic pen 21C. The storage pen data can be acquired later, and the function ID included in the storage pen data can be used to execute the information processing and obtain the processing result.

The environment and the situation concerning the storage pen data of the same person vary due to the difference in the processing application that processes the pen data, and the way the person holds the pen and the degree of concentration also vary. Thus, the writing trace or the drawing trace of the storage pen data as a result of the writing input or the drawing input often varies.

For example, when the person takes notes in shorthand, the recordability is more important than accuracy in writing and beauty in characters. The characters or the like may be somewhat messy as long as recognizable characters are input. Hence, the writing trace based on the pen data in the processing application for taking notes is different from the writing trace of the same person based on the pen data in another processing application for processing the normal writing input.

The handwriting at a test center in taking a test or the handwriting in signing a contract is also often different from normal handwriting of the same person.

The way the person holds or grips the writing brush (electronic pen) in drawing a picture is different from that in writing, and the way the person holds the pen and the strength of holding the pen vary in pencil drawing, oil painting, and sketching, for example.

In the embodiment, each piece of the pen data includes the function ID for identifying the processing application. Hence, the function ID can be referenced to easily recognize the environment, the situation, the way the person holds the pen, and the degree of concentration of the person in inputting the writing or drawing.

Modifications of Embodiment

In the embodiment, the server apparatus 1 has not only the function of storing the storage pen data, but also the function of executing the electronic authentication service and the character recognition service and the function of executing the information providing service. However, the server apparatus 1 may have only the function of storing the storage pen data, and a separate server apparatus may use the storage pen data in the server apparatus 1 to execute the other service functions. The server apparatus 1 may have the function of storing the storage pen data and the function of executing the information providing service, and a separate service apparatus may use the storage pen data in the server apparatus 1 to execute the function of the electronic authentication service and the character recognition service. It is obvious that separate server apparatuses may each use the storage pen data in the server apparatus 1 to execute the function of executing the electronic authentication service and the function of executing the character recognition service.

When a server apparatus separate from the server apparatus 1 is configured to use the storage pen data in the server apparatus 1 to execute the functions of the electronic authentication service and the character recognition service, the same storage pen data as the storage pen data included in the request for the electronic authentication service or the character recognition service is also transmitted to the server apparatus 1 directly from the pen input apparatus or through the separate server apparatus that executes the functions of the electronic authentication service and the character recognition service, and the storage pen data is stored in the storage pen data storage unit 104.

The communication network NW is not limited to the Internet as in the example of FIG. 1, and the communication network NW may be an intranet, such as a wide area network (WAN) and a local area network (LAN). In addition, one pen input apparatus may be provided for the pen data storage server apparatus instead of a plurality of pen input apparatuses. The communication network may be a wired network or may be a wireless network.

It is obvious that the pen data storage apparatus of the disclosure may be an apparatus in which the pen input apparatus and the server apparatus are integrated, instead of a system including the server apparatus and the pen input apparatus connected through the communication network as in the embodiment.

It is obvious that the processing functions corresponding to the function IDs included in the storage pen data are not limited to the cases of the examples. For example, the processing functions can also be applied to a case in which the pen input apparatus includes a pad terminal and an electronic pen that execute an examination app for entrance examination, qualification examination, learning effect examination, or the like. The pad terminal receives information regarding a question from the server apparatus and detects an input of an answer input by the electronic pen in response to the question. The pad terminal generates storage pen data including the function ID of the examination app and transmits the generated storage pen data regarding the answer to the server apparatus. In this case, the electronic pen is dedicated to each examinee, and the pen ID is associated with each examinee.

In this case, the pen ID and the storage pen data including the function ID of the examination app can be collected to create an examination database for each examinee, and the learning effect of the examinee can easily be checked.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A pen data storage apparatus, comprising:
a position detection device including a sensor having a detection region that includes at least a first region and a second region different from the first region, wherein the sensor, in operation, detects coordinates of a plurality of positions input by an electronic pen; and
a processor configured to cause a data storage device to store pen data including at least coordinate data regarding the plurality of positions input by the electronic pen,
wherein the first region corresponds to a first processing function corresponding to a first software application, and the second region corresponds to a second processing function different from the first processing function corresponding to a second software application different from the first software application,
wherein the pen data includes at least first processing function identification information that identifies the first processing function corresponding to the first software application, and second processing function identification information that identifies the second processing function corresponding to the second software application, and
wherein, in the pen data, the first processing function identification information is associated with the coordinate data regarding one or more of the positions input by the electronic pen in the first region, and the second processing function identification information is associated with the coordinate data regarding one or more of the positions input by the electronic pen in the second region.

2. The pen data storage apparatus according to claim 1, wherein
the pen data includes information regarding a time of input by the electronic pen.

3. The pen data storage apparatus according to claim 2, further comprising:
the data storage device,
wherein, when the data storage device receives a pen data acquisition request including information regarding a period of input by the electronic pen, the data storage device, in operation, returns the pen data including the information regarding the time in the period included in the pen data acquisition request to a device that has requested acquisition of the pen data.

4. The pen data storage apparatus according to claim 1, wherein
the pen data includes position information regarding a location of input by the electronic pen.

5. The pen data storage apparatus according to claim 4, further comprising:
the data storage device,
wherein, when the data storage device receives a pen data acquisition request including information regarding the location of input by the electronic pen, the data storage device, in operation, returns the pen data of the location included in the pen data acquisition request to a device that has requested acquisition of the pen data.

6. The pen data storage apparatus according to claim 1, wherein
the pen data includes at least one of information regarding a time of an input by the electronic pen, position information regarding a location of the input by the electronic pen, information regarding a height position of the electronic pen from an input surface, information regarding a pen pressure detected by the electronic pen, state information regarding a switch provided on the electronic pen, or information regarding a tilt of the electronic pen with respect to the input surface.

7. The pen data storage apparatus according to claim 1, wherein
the pen data includes identification information of the electronic pen.

8. The pen data storage apparatus according to claim 1, further comprising:
an information processing device which, in operation, performs the first processing function and the second processing function.

9. The pen data storage apparatus according to claim 8, wherein
the first region overlaps the second region,
the information processing device, in operation, manages the first region and the second region of the sensor as regions respectively associated with different ranks, and,
when one or more of the positions input by the electronic pen are detected in the first region, the information processing device, in operation, refers to information regarding the different ranks and specifies the first processing function identification information that identifies the first processing function, wherein the first processing function identification information that identifies the first processing function is set in association with the first region.

10. The pen data storage apparatus according to claim 8, wherein
the position detection device and the information processing device are integrated in an apparatus.

11. The pen data storage apparatus according to claim 1, wherein
the detection region of the sensor of the position detection device includes a region for which the pen data is not stored in the data storage device.

12. The pen data storage apparatus according to claim 1, further comprising:
an information processing device which, in operation, performs the first processing function and the second processing function,
wherein the detection region of the sensor of the position detection device includes a region in which one of the first processing function and the second processing function is not activated by an instruction input by the electronic pen but the pen data is stored.

13. The pen data storage apparatus according to claim 1, further comprising:
the data storage device,
wherein the data storage device, in operation, operates as a server that acquires the pen data through a communication network and stores the pen data.

14. The pen data storage apparatus according to claim 1, further comprising:
the electronic pen; and
an information processing device which, in operation, performs the first processing function and the second processing function for the pen data.

15. The pen data storage apparatus according to claim 14, wherein
the electronic pen, in operation, transmits information that designates the first processing function and the second processing function for the pen data to the information processing device, and
the information processing device, in operation, uses the first processing function and the second processing function designated by the information that designates the first processing function and the second processing function received from the electronic pen to process the pen data.

16. The pen data storage apparatus according to claim 14, further comprising:
the data storage device,
wherein the data storage device, in operation, operates as a server that acquires the pen data through a communication network and that stores the pen data.

17. The pen data storage apparatus according to claim 14, wherein
the position detection device and the information processing device are integrated in an apparatus.

18. The pen data storage apparatus according to claim 1, further comprising:
the data storage device,
wherein, when the data storage device receives a pen data acquisition request including the first processing function identification information and the second processing function identification information, the data storage device returns the pen data associated with the first processing function identification information and the second processing function identification information included in the pen data acquisition request to a device that has requested acquisition of the pen data.

19. The pen data storage apparatus according to claim 1, further comprising:
the data storage device,
wherein, when the data storage device receives a pen data acquisition request including identification information of the electronic pen, the data storage device, in operation, returns the pen data including the identification information of the electronic pen included in the pen data acquisition request to a device that has requested acquisition of the pen data.

20. The pen data storage apparatus according to claim 1, wherein
the first processing function and the second processing function are included in software of an information processing device.

* * * * *